US012743044B2

(12) United States Patent
Yanagihara et al.

(10) Patent No.: US 12,743,044 B2
(45) Date of Patent: Sep. 22, 2026

(54) IMAGE-FORMING APPARATUS CONFIGURED TO MOVE MOVABLE GEAR TO MESH WITH FIRST GEAR BEFORE RECEIVING PRINT COMMAND

(71) Applicant: BROTHER KOGYO KABUSHIKI KAISHA, Nagoya (JP)

(72) Inventors: Sota Yanagihara, Nagoya (JP); Shuya Ichikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/081,356

(22) Filed: Mar. 17, 2025

(65) Prior Publication Data

US 2025/0306513 A1 Oct. 2, 2025

(30) Foreign Application Priority Data

Mar. 28, 2024 (JP) ................................ 2024-054075

(51) Int. Cl.

| | |
|---|---|
| ***G03G 15/00*** | (2006.01) |
| ***G03G 15/08*** | (2006.01) |
| ***G03G 15/16*** | (2006.01) |
| ***G03G 15/20*** | (2006.01) |

(52) U.S. Cl.

CPC ..... *G03G 15/5008* (2013.01); *G03G 15/0808* (2013.01); *G03G 15/1615* (2013.01); *G03G 15/2032* (2013.01); *G03G 15/2064* (2013.01); *G03G 15/6529* (2013.01); *G03G 15/757* (2013.01)

(58) Field of Classification Search

CPC .......... G03G 15/0808; G03G 15/1615; G03G 15/2032; G03G 15/2064; G03G 15/5008; G03G 15/6529; G03G 15/757

See application file for complete search history.

(56) References Cited

U.S. PATENT DOCUMENTS

| | | | | |
|---|---|---|---|---|
| 2019/0072889 A1* | 3/2019 | Sato | .................. | G03G 15/2064 |
| 2021/0200116 A1* | 7/2021 | Nishimura | ......... | G03G 21/1647 |
| 2024/0255894 A1* | 8/2024 | Ota | .................... | G03G 15/2064 |

FOREIGN PATENT DOCUMENTS

| | | |
|---|---|---|
| JP | 2020-143702 A | 9/2020 |

* cited by examiner

*Primary Examiner* — Hoang X Ngo

(74) *Attorney, Agent, or Firm* — Merchant & Gould P.C.

(57) ABSTRACT

An image-forming apparatus includes: a motor; a transfer roller; a fixing device; a movable first cam; a first gear train including a first gear and a movable gear; a second gear train including a switching mechanism; and a controller. The fixing device includes a heat roller and a pressure roller providing a nip pressure therebetween. The controller is configured to perform: a first process for setting the nip pressure to a first nip pressure; a second process for setting the nip pressure to a second nip pressure lower than the first nip pressure; and a connection process for moving the movable gear to mesh with first gear. The controller is configured to wait for a print command in a state where the movable gear is meshed with the first gear by performing the connection process after completing the second process.

19 Claims, 18 Drawing Sheets

IMAGE-FORMING APPARATUS CONFIGURED TO MOVE MOVABLE GEAR TO MESH WITH FIRST GEAR BEFORE RECEIVING PRINT COMMAND

REFERENCE TO RELATED APPLICATIONS

This application claims priority from Japanese Patent Application No. 2024-054075 filed on Mar. 28, 2024. The entire content of the priority application is incorporated herein by reference.

BACKGROUND ART

A conventionally known image-forming apparatus includes a sheet-feeding device configured to feed sheets, and a transmission mechanism configured to transmit a drive force to the sheet-feeding device. The transmission mechanism includes a drive gear that is rotatable forward and in reverse by a motor, a movable gear that can move between a first position and second position in accordance with the rotation of the drive gear, and a follow gear that is meshed with the movable gear when the movable gear is at the first position and separated from the movable gear when the movable gear is at the second position.

SUMMARY

In the conventional technology described above, the movable gear is moved from the second position to the first position to be meshed with the follow gear when printing is started, for example. Consequently, it may take some time for the movable gear to move from the second position to the first position and mesh with the follow gear and an abnormal noise may be noticeable when the movable gear meshes with the follow gear, among other issues.

In view of the foregoing, it is an object of the present disclosure to suppress an abnormal noise in an image-forming apparatus caused by a movable gear when the apparatus starts printing after receiving a print command.

In order to attain the above and other objects, according to one aspect, the present disclosure provides an image-forming apparatus including a main motor, a transfer roller, a fixing device, a first cam, a first gear train, a second gear train, and a controller. The motor is configured to rotate forward and in reverse. The fixing device includes a heat roller and a pressure roller configured to nip a sheet therebetween to fix an image to the sheet. The heat roller and the pressure roller provide a nip pressure therebetween. The first cam is movable between a first position and a second position. The first cam at the first position brings the nip pressure into a first nip pressure. The first cam at the second position brings the nip pressure into a second nip pressure lower than the first nip pressure. The first cam is movable to the first position in response to forward rotation of the motor. The first cam is movable to the second position in response to reverse rotation of the motor. The first gear train is configured to transmit a drive force of the motor to one of the heat roller and the pressure roller. The first gear train includes: a first gear; and a movable gear movable between a transmission position and a non-transmission position. The movable gear at the transmission position is in mesh with the first gear and is configured to transmit the drive force to the first gear. The movable gear at the non-transmission position is separated from the first gear and is configured not to transmit the drive force to the first gear. The movable gear is movable to the transmission position in response to forward rotation of the motor. The movable gear is movable to the non-transmission position in response to reverse rotation of the motor. The second gear train is configured to transmit the drive force of the motor to the first cam. The second gear train includes a switching mechanism configured to switch in state between a transmission state and an interruption state. The switching mechanism at the transmission state is configured to transmit the drive force to the first cam. The switching mechanism at the interruption state is configured not to transmit the drive force to the first cam. The controller is configured to perform: a first process; a second process; and a connection process. The first process is for setting the nip pressure to the first nip pressure by rotating the motor forward and placing the switching mechanism in the transmission state. The second process is for setting the nip pressure to the second nip pressure by rotating the motor in reverse and placing the switching mechanism in the transmission state. The connection process is for moving the movable gear from the non-transmission position to the transmission position by rotating the motor forward while the switching mechanism is in the interruption state. The controller is configured to wait for a print command in a state where the movable gear is meshed with the first gear by performing the connection process after completing the second process.

With the above structure, since the controller is configured to wait for a print command while the movable gear is meshed with the first gear by performing the connection process after completing the second process, this configuration can suppress generation of an abnormal noise caused by contact between the movable gear and the first gear when the controller starts printing after receiving a print command.

According to another aspect, the present disclosure also provides an image-forming apparatus including a motor, a transfer roller, a rotatable body, a movable member, a first gear train, a second gear train, and a controller. The motor is configured to rotate forward and in reverse. The rotatable body is configured to convey a sheet. The movable member is movable between a first position and a second position. The movable member is movable to the first position in response to forward rotation of the motor. The movable member is movable to the second position in response to reverse rotation of the motor. The first gear train is configured to transmit a drive force of the motor to the rotatable body. The first gear train includes: a first gear; and a movable gear movable between a transmission position and a non-transmission position. The movable gear at the transmission position is in mesh with the first gear and is configured to transmit the drive force to the first gear. The movable gear at the non-transmission position is separated from the first gear and is configured not to transmit the drive force to the first gear. The movable gear is movable to the transmission position in response to forward rotation of the motor. The movable gear is movable to the non-transmission position in response to reverse rotation of the motor. The second gear train is configured to transmit the drive force of the motor to the movable member. The second gear train includes a switching mechanism configured to switch in state between a transmission state and an interruption state. The switching mechanism at the transmission state is configured to transmit the drive force to the movable member. The switching mechanism at the interruption state is configured not to transmit the drive force to the movable member. The controller is configured to perform: a first process; a second process; and a connection process. The first process is for moving the movable member to the first position by rotating the motor forward and placing the switching mechanism in the transmission state. The second process is for moving the movable member to the second position by rotating the motor in reverse and placing the switching mechanism in the transmission state. The connection process is for moving the movable gear from the non-transmission position to the transmission position by rotating the motor forward while the switching mechanism is in the interruption state. The controller is configured to wait for a print command in a state where the movable gear is meshed with the first gear by performing the connection process after completing the second process.

With the above structure, since the controller is configured to wait for a print command while the movable gear is meshed with the first gear by performing the connection process after completing the second process, this configuration can suppress generation of an abnormal noise caused by contact between the movable gear and the first gear when the controller begins printing after receiving a print command.

DESCRIPTION

Hereinafter, an image-forming apparatus 1 according to an embodiment of the present disclosure will be described while referring to accompanying drawings.

The image-forming apparatus 1 according to the embodiment is a color printer.

Figure 1:
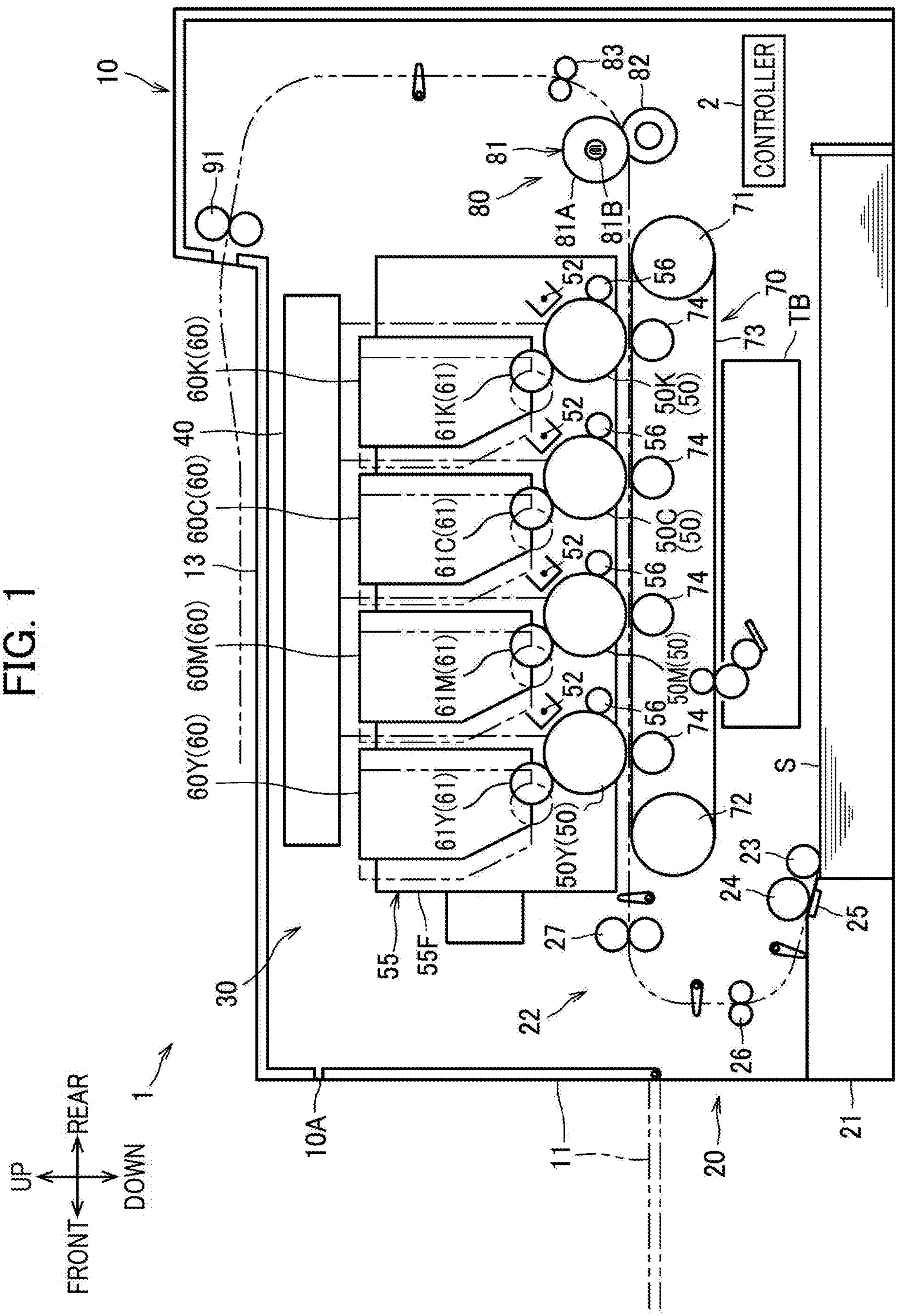
FIG. 1 is a schematic vertical cross-sectional view of an image-forming apparatus.

In the present embodiment, the left side in FIG. 1 will denote the "front" side and the right side in FIG. 1 will denote the "rear" side of the image-forming apparatus 1. Additionally, the top and bottom in FIG. 1 will be referred to as the "top" and the "bottom." The near side of the drawing in FIG. 1 will be called the "right" side and the far side of the drawing in FIG. 1 will be called the "left" side.

Referring to FIG. 1, the image-forming apparatus 1 includes a main casing 10, a front cover 11, a sheet-feeding unit 20, an image-forming unit 30, a fixing device 80, second discharge rollers 91, and a controller 2. The fixing device 80 is an example of "fixing device" of the disclosure, and the controller 2 is an example of "controller" of the disclosure.

The main casing 10 has a front end portion where an opening 10A is formed. The front cover 11 opens and closes the opening 10A. Specifically, the front cover 11 is pivotable, relative to the main casing 10, between a closed position depicted by solid lines in FIG. 1 and an open position depicted by phantom lines in FIG. 1. In the closed position, the front cover 11 covers the opening 10A. In the open position, the front cover 11 exposes the opening 10A.

The sheet-feeding unit 20 includes a sheet tray 21, and a sheet-feeding mechanism 22. The sheet tray 21 is configured to accommodate sheets S therein. Upon receipt of a drive force, the sheet-feeding mechanism 22 is configured to feed the sheets S toward photosensitive drums 50 (50Y, 50M, 50C, and 50K) in the image-forming unit 30 described later. The sheet-feeding mechanism 22 includes a pickup roller 23, a separating roller 24, a separating pad 25, conveying rollers 26, and registration rollers 27. The pickup roller 23, separating roller 24, conveying rollers 26, and registration rollers 27 are examples of "feeding roller" of the disclosure. The pickup roller 23, separating roller 24, conveying rollers 26, and registration rollers 27 are also examples of "rotatable body" of the disclosure.

The pickup roller 23 of the sheet-feeding mechanism 22 is configured to feed the sheets S from the sheet tray 21. The sheets S are then separated into individual sheets, one by one, between the separating roller 24 and separating pad 25. Thereafter, the conveying rollers 26 and registration rollers 27 of the sheet-feeding mechanism 22 are configured to feed each sheet S toward the image-forming unit 30.

The image-forming unit 30 includes an exposure unit 40, four photosensitive drums 50, four developing cartridges 60, and a transfer unit 70.

The exposure unit 40 includes a light source, a deflector, lenses, and mirrors, for example. The exposure unit 40 is configured to expose peripheral surfaces of the photosensitive drums 50 by emitting light beams, as depicted by one-dot chain lines in FIG. 1.

The four photosensitive drums 50 include a photosensitive drum 50Y for the color of yellow, a photosensitive drum 50M for the color of magenta, a photosensitive drum 50C for the color of cyan, and a photosensitive drum 50K for the color of black. The photosensitive drums 50 are arranged, from upstream side toward downstream side in a conveying direction of the sheet S, in the order of the photosensitive drum 50Y, photosensitive drum 50M, photosensitive drum 50C, and photosensitive drum 50K. Hereinafter, the conveying direction of the sheet S will be referred to simply as a sheet-conveying direction.

Specifically, the photosensitive drum 50Y is arranged upstream of the photosensitive drum 50M in the sheet-conveying direction. The photosensitive drum 50M is arranged upstream of the photosensitive drum 50C in the sheet-conveying direction. The photosensitive drum 50C is arranged upstream of the photosensitive drum 50K in the sheet-conveying direction.

Hereinafter, for components associated with individual colors, the letter Y, M, C, or K is appended to the reference numeral of the component in this specification and the drawings when distinguishing among the four colors, while the letter Y, M, C, or K is omitted from the reference numeral when the distinction among the four colors is unnecessary.

The image-forming apparatus 1 further includes a drawer 55. The drawer 55 is movable, relative to the main casing 10, in a direction in which the photosensitive drums 50 are aligned. Specifically, the drawer 55 is movable in the direction in which the photosensitive drums 50 are aligned between an inner position and an outer position through the opening 10A which is exposed when the front cover 11 is opened. In the inner position, the drawer 55 is accommodated inside the main casing 10. In the outer position, at least a part of the drawer 55 is exposed outside the main casing 10. In the present embodiment, the drawer 55 is deemed to be in the outer position when the drawer 55 is pulled forward from the inner position. Further, in the present embodiment, the drawer 55 can also be removed from the main casing 10.

The drawer 55 has a frame 55F. The frame 55F rotatably supports the four photosensitive drums 50 (50Y, 50M, 50C, and 50K). The frame 55F also supports four chargers 52. The chargers 52 are configured to charge the peripheral surfaces of the corresponding photosensitive drums 50.

The frame 55F also supports cleaning rollers 56. The cleaning rollers 56 are configured to clean the peripheral surfaces of the corresponding photosensitive drums 50. One cleaning roller 56 is provided for each of the four photosensitive drums 50. The cleaning rollers 56 are an example of "cleaning member" of the disclosure.

The four developing cartridges 60 include a developing cartridge 60Y that accommodates yellow toner, a developing cartridge 60M that accommodates magenta toner, a developing cartridge 60C that accommodates cyan toner, and a developing cartridge 60K that accommodates black toner. The developing cartridge 60Y has a developing roller 61Y configured to supply the yellow toner to the photosensitive drum 50Y. The developing cartridge 60M has a developing roller 61M configured to supply the magenta toner to the photosensitive drum 50M. The developing cartridge 60C has a developing roller 61C configured to supply the cyan toner to the photosensitive drum 50C. The developing cartridge 60K has a developing roller 61K configured to supply the black toner to the photosensitive drum 50K.

The developing roller 61Y is movable, relative to the photosensitive drum 50Y, between a contact position where the developing roller 61Y is in contact with the photosensitive drum 50Y, and a separated position where the developing roller 61Y is separated from the photosensitive drum 50Y. The developing roller 61M is movable, relative to the photosensitive drum 50M, between a contact position where the developing roller 61M is in contact with the photosensitive drum 50M, and a separated position where the developing roller 61M is separated from the photosensitive drum 50M. The developing roller 61C is movable, relative to the photosensitive drum 50C, between a contact position where the developing roller 61C is in contact with the photosensitive drum 50C, and a separated position where the developing roller 61C is separated from the photosensitive drum 50C. The developing roller 61K is movable, relative to the photosensitive drum 50K, between a contact position where the developing roller 61K is in contact with the photosensitive drum 50K, and a separated position where the developing roller 61K is separated from the photosensitive drum 50K.

The frame 55F of the drawer 55 detachably supports the developing cartridges 60 (60Y, 60M, 60C, and 60K). The developing cartridges 60 can be replaced when the drawer 55 is at the outer position or when the drawer 55 is removed from the main casing 10.

While supported on the frame 55F, each developing cartridge 60 is movable forward and rearward between a developing position depicted by solid lines, and a non-developing position depicted by phantom lines. In the developing position, the developing cartridge 60 places the corresponding developing roller 61 at the contact position. In the non-developing position, the developing cartridge 60 places the corresponding developing roller 61 at the separated position.

Specifically, the developing cartridge 60Y is movable relative to the photosensitive drum 50Y between the developing position for placing the developing roller 61Y at the contact position, and the non-developing position for placing the developing roller 61Y at the separated position. In other words, the developing cartridge 60Y is movable relative to the photosensitive drum 50Y between the developing position where the developing roller 61Y is in contact with the photosensitive drum 50Y, and the non-developing position where the developing roller 61Y is separated from the photosensitive drum 50Y.

Similarly, the developing cartridge 60M is movable relative to the photosensitive drum 50M between the developing position for placing the developing roller 61M at the contact position, and the non-developing position for placing the developing roller 61M at the separated position. In other words, the developing cartridge 60M is movable relative to the photosensitive drum 50M between the developing position where the developing roller 61M is in contact with the photosensitive drum 50M, and the non-developing position where the developing roller 61M is separated from the photosensitive drum 50M.

Similarly, the developing cartridge 60C is movable relative to the photosensitive drum 50C between the developing position for placing the developing roller 61C at the contact position, and the non-developing position for placing the developing roller 61C at the separated position. In other words, the developing cartridge 60C is movable relative to the photosensitive drum 50C between the developing position where the developing roller 61C is in contact with the photosensitive drum 50C, and the non-developing position where the developing roller 61C is separated from the photosensitive drum 50C.

Similarly, the developing cartridge 60K is movable relative to the photosensitive drum 50K between the developing position for placing the developing roller 61K at the contact position, and the non-developing position for placing the developing roller 61K at the separated position. In other words, the developing cartridge 60K is movable relative to the photosensitive drum 50K between the developing position where the developing roller 61K is in contact with the photosensitive drum 50K, and the non-developing position where the developing roller 61K is separated from the photosensitive drum 50K.

The transfer unit 70 includes a drive roller 71, a follow roller 72, an endless conveying belt 73, and four transfer rollers 74. The conveying belt 73 is mounted over the drive roller 71 and follow roller 72 under tension so that an outer surface of the endless conveying belt 73 is in contact with the four photosensitive drums 50. The transfer rollers 74 are arranged in an internal space defined by the conveying belt 73, with the conveying belt 73 pinched between the transfer rollers 74 and the corresponding photosensitive drums 50. A waste toner box TB is also provided beneath the transfer unit 70 for collecting waste toner from the conveying belt 73. The transfer rollers 74 are an example of "transfer roller" of the disclosure.

The fixing device 80 is configured to fix toner images (images), which were transferred onto a sheet S, to the sheet S. The fixing device 80 includes a heating unit 81, a pressure unit 82, and first discharge rollers 83. The heating unit 81 includes a heating roller 81A, and a heater 81B. The heating roller 81A is formed of metal in a cylindrical shape. The heater 81B is arranged to extend through the inside of the heating roller 81A for heating the same. The heating roller 81A is an example of "heat roller" of the disclosure. The pressure unit 82 is an example of "pressure roller" of the disclosure. Either the heating roller 81A or the pressure unit 82 (pressure roller) is also another example of the rotatable body of the disclosure.

The pressure unit 82 is configured to press each sheet S against the heating unit 81. Specifically, the pressure unit 82 is a pressure roller configured to apply pressure to the heating roller 81A for nipping each sheet S therebetween. The pressure roller (pressure unit 82) is configured of a metal core surrounded by a rubber layer. When the fixing device 80 receives a drive force, the heating roller 81A of the heating unit 81 and the pressure unit 82 (pressure roller) convey the sheet S nipped therebetween. When the fixing device 80 receives the drive force, the first discharge rollers 83 also convey the sheet S.

In the image-forming unit 30, the peripheral surfaces of the photosensitive drums 50 are uniformly charged by the corresponding chargers 52 and are subsequently exposed to light beams irradiated from the exposure unit 40. As a result, in the image-forming unit 30, electrostatic latent images are formed on the respective photosensitive drums 50 based on image data. Further, the developing rollers 61 in their contact positions supply toner from the corresponding developing cartridges 60 to the corresponding photosensitive drums 50. In this way, in the image-forming unit 30, toner images are formed on the respective photosensitive drums 50.

In the meantime, a sheet S fed from the sheet-feeding unit 20 is conveyed between the photosensitive drums 50 and the corresponding transfer rollers 74. The image-forming unit 30 transfers the toner images formed on the photosensitive drums 50 onto the sheet S while the sheet S is conveyed between the photosensitive drums 50 and the corresponding transfer rollers 74. In other words, the image-forming unit 30 forms an image on the sheet S. After toner images have been transferred onto the sheet S, the fixing device 80 fixes the toner images to the sheet S as the sheet S is conveyed between the heating roller 81A and the pressure unit 82.

When the sheet S exits from between the heating unit 81 and pressure unit 82, the first discharge rollers 83 and second discharge rollers 91 discharge the sheet S from the main casing 10 upon receipt of a drive force. Specifically, the first discharge rollers 83 and second discharge rollers 91 discharge the sheet S on which the toner images have been fixed onto a discharge tray 13 provided on the top of the main casing 10.

Figure 2:
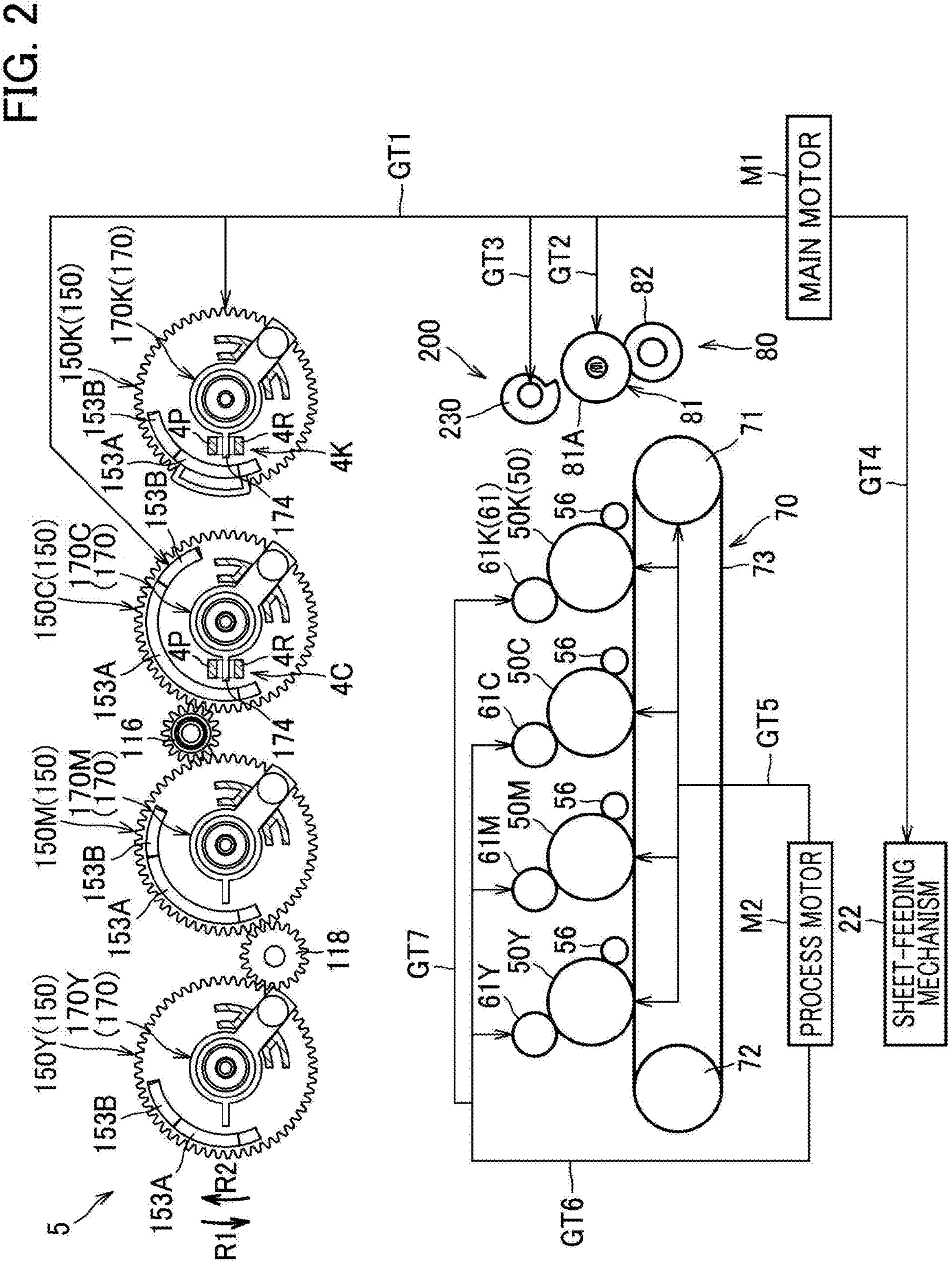
FIG. 2 is a view conceptually illustrating a drive force transmission system in the image-forming apparatus.

As illustrated in FIG. 2, the image-forming apparatus 1 further includes a main motor M1, a process motor M2, a separating mechanism 5, and a nip-pressure adjusting mechanism 200. The main motor M1 is an example of "motor" of the disclosure. The process motor M2 is an example of "process motor" of the disclosure.

The main motor M1 is a motor configured to drive separating cams 150 (described later) of the separating mechanism 5, the fixing device 80, the nip-pressure adjusting mechanism 200, and the sheet-feeding mechanism 22. In other words, the separating cams 150 of the separating mechanism 5, fixing device 80, nip-pressure adjusting mechanism 200, and sheet-feeding mechanism 22 are configured to receive a drive force from the main motor M1. The main motor M1 can rotate forward or in reverse. The main motor M1 rotates forward when conveying a sheet S from the sheet tray 21 toward the discharge tray 13 in order to form an image on the sheet S.

The process motor M2 is a motor configured to drive the photosensitive drums 50, cleaning rollers 56, developing rollers 61, and transfer unit 70. In other words, the photosensitive drums 50, cleaning rollers 56, developing rollers 61, and transfer unit 70 are configured to receive a drive force from the process motor M2.

Figure 3:
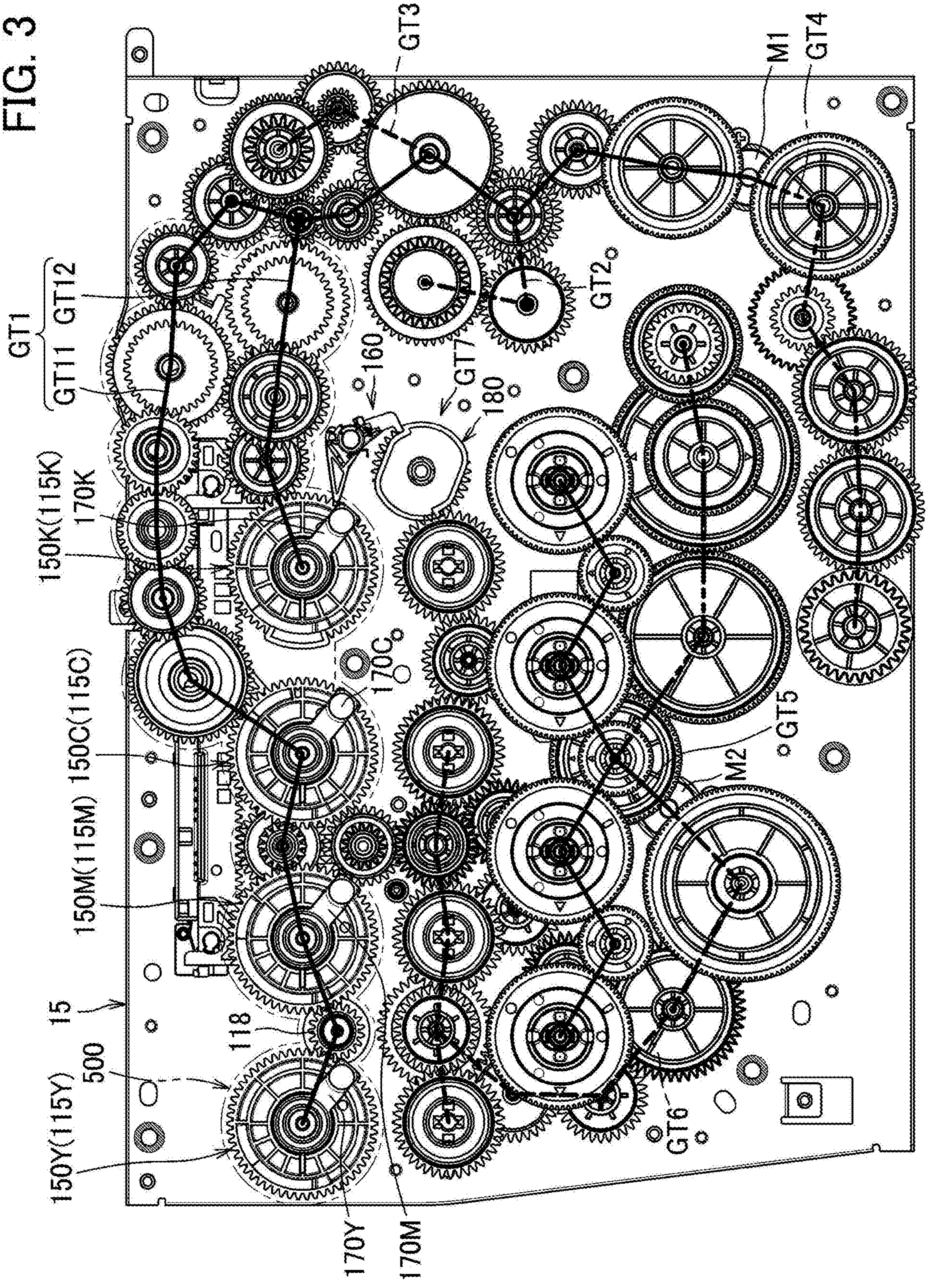
FIG. 3 is a view illustrating a metal plate and gear trains supported thereon in the image-forming apparatus.

As illustrated in FIGS. 2 and 3, the image-forming apparatus 1 further includes a developing-roller separation gear train GT1, a fixing-device drive gear train GT2, a nip-pressure adjustment gear train GT3, a sheet feed gear train GT4, a photosensitive-drum drive gear train GT5, a first-developing-roller drive gear train GT6, and a second-developing-roller drive gear train GT7. The fixing-device drive gear train GT2 is an example of "first gear train" of the disclosure. The nip-pressure adjustment gear train GT3 is an example of "second gear train" of the disclosure. The developing-roller separation gear train GT1 is an example of "third gear train" of the disclosure. The sheet feed gear train GT4 is an example of "fourth gear train" of the disclosure. The fixing-device drive gear train GT2 and sheet feed gear train GT4 are also examples of "first gear train" of the disclosure, and the nip-pressure adjustment gear train GT3 and developing-roller separation gear train GT1 are also examples of "second gear train" of the disclosure.

The developing-roller separation gear train GT1 is configured to transmit the drive force of the main motor M1 to the respective separating cams 150 (150Y, 150M, 150C, and 150K) of the separating mechanism 5.

The fixing-device drive gear train GT2 is configured to receive the drive force of the main motor M1 from the developing-roller separation gear train GT1 and transmit this drive force to the fixing device 80. Specifically, the fixing-device drive gear train GT2 is configured to receive the drive force of the main motor M1 from the developing-roller separation gear train GT1 and transmit this force to the heating roller 81A of the fixing device 80.

The nip-pressure adjustment gear train GT3 is configured to receive the drive force of the main motor M1 from the developing-roller separation gear train GT1 and transmit this drive force to nip-pressure adjusting cams 230 (described later) of the nip-pressure adjusting mechanism 200.

The sheet feed gear train GT4 is configured to transmit the drive force of the main motor M1 to the sheet-feeding mechanism 22.

The photosensitive-drum drive gear train GT5 is configured to transmit a drive force of the process motor M2 to the photosensitive drums 50 (50Y, 50M, 50C, and 50K).

The first-developing-roller drive gear train GT6 is configured to transmit the drive force of the process motor M2 to the respective developing rollers 61Y, 61M, and 61C.

The second-developing-roller drive gear train GT7 is configured to transmit the drive force of the process motor M2 to the developing roller 61K. Specifically, the second-developing-roller drive gear train GT7 is configured to receive the drive force of the process motor M2 from the first-developing-roller drive gear train GT6 and transmit this drive force to the developing roller 61K.

Note that the cleaning rollers 56 may be configured to rotate by the drive force of the process motor M2 received via the photosensitive-drum drive gear train GT5, first-developing-roller drive gear train GT6, or second-developing-roller drive gear train GT7 or via another gear train.

The separating mechanism 5 is configured to move the developing rollers 61 between their contact positions and separated positions by the drive force received from the main motor M1. The separating mechanism 5 includes the four separating cams 150, and four cam followers 170.

The separating cams 150 include a separating cam 150Y, a separating cam 150M, a separating cam 150C, and a separating cam 150K. The separating cams 150 (150Y, 150M, 150C, 150K) are an example of "second cam" of the disclosure.

The separating cam 150Y is configured to rotate in response to receiving the drive force from the main motor M1 to move the developing roller 61Y between its contact position and separated position. Specifically, the separating cam 150Y is configured to rotate to move the developing cartridge 60Y between the developing position and non-developing position, which movement causes the developing roller 61Y to move between the contact position and the separated position.

The separating cam 150M is configured to rotate in response to receiving the drive force from the main motor M1 to move the developing roller 61M between its contact position and separated position. Specifically, the separating cam 150M is configured to rotate to move the developing cartridge 60M between the developing position and non-developing position, which movement causes the developing roller 61M to move between the contact position and the separated position.

The separating cam 150C is configured to rotate in response to receiving the drive force from the main motor M1 to move the developing roller 61C between its contact position and separated position. Specifically, the separating cam 150C is configured to rotate to move the developing cartridge 60C between the developing position and non-developing position, which movement causes the developing roller 61C to move between the contact position and the separated position.

The separating cam 150K is configured to rotate in response to receiving the drive force from the main motor M1 to move the developing roller 61K between its contact position and separated position. Specifically, the separating cam 150K is configured to rotate to move the developing cartridge 60K between the developing position and non-developing position, which movement causes the developing roller 61K to move between the contact position and the separated position.

Figure 4:
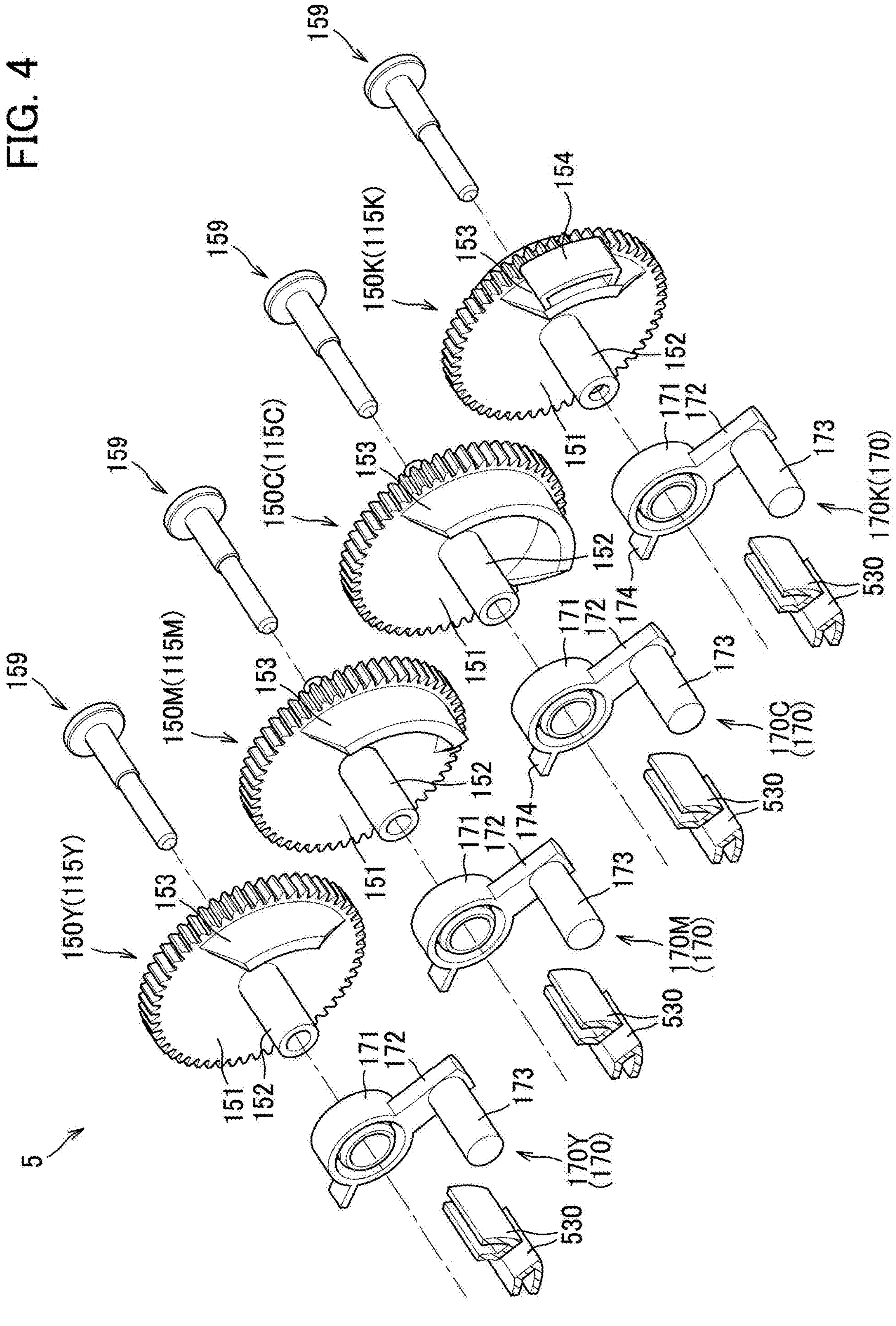
FIG. 4 is an exploded perspective view illustrating separating cams, cam followers, shafts, and stoppers in the image-forming apparatus.

As illustrated in FIG. 4, the cam followers 170 include a cam follower 170Y, a cam follower 170M, a cam follower 170C, and a cam follower 170K. The cam followers 170 are slidingly movable in directions along rotational axes of the corresponding separating cams 150. The rotational axes of the separating cams 150 are depicted by one-dot chain lines in FIG. 4. Hereinafter, directions along the rotational axis of each separating cam 150 will simply be called "axial direction." The axial directions of the separating cams 150 are also coincident with axial directions of corresponding cam gears 115 (115Y, 115M, 115C, and 115K) described later.

The cam follower 170Y is slidingly movable in the axial direction of the separating cam 150Y between a pressing position and a non-pressing position in accordance with the rotation of the separating cam 150Y (the cam gear 115Y). In the pressing position, the cam follower 170Y presses against the developing cartridge 60Y to place the developing cartridge 60Y at the non-developing position. In the non-pressing position, the cam follower 170Y places the developing cartridge 60Y at the developing position.

The cam follower 170M is slidingly movable in the axial direction of the separating cam 150M between a pressing position and a non-pressing position in accordance with the rotation of the separating cam 150M (the cam gear 115M). In the pressing position, the cam follower 170M presses against the developing cartridge 60M to place the developing cartridge 60M at the non-developing position. In the non-pressing position, the cam follower 170M places the developing cartridge 60M at the developing position.

The cam follower 170C is slidingly movable in the axial direction of the separating cam 150C between a pressing position and a non-pressing position in accordance with the rotation of the separating cam 150C (the cam gear 115C). In the pressing position, the cam follower 170C presses against the developing cartridge 60C to place the developing cartridge 60C at the non-developing position. In the non-pressing position, the cam follower 170C places the developing cartridge 60C at the developing position.

The cam follower 170K is slidingly movable in the axial direction of the separating cam 150K between a pressing position and a non-pressing position in accordance with the rotation of the separating cam 150K (the cam gear 115K). In the pressing position, the cam follower 170K presses against the developing cartridge 60K to place the developing cartridge 60K at the non-developing position. In the non-pressing position, the cam follower 170K places the developing cartridge 60K at the developing position.

Figures 5A, 5B:
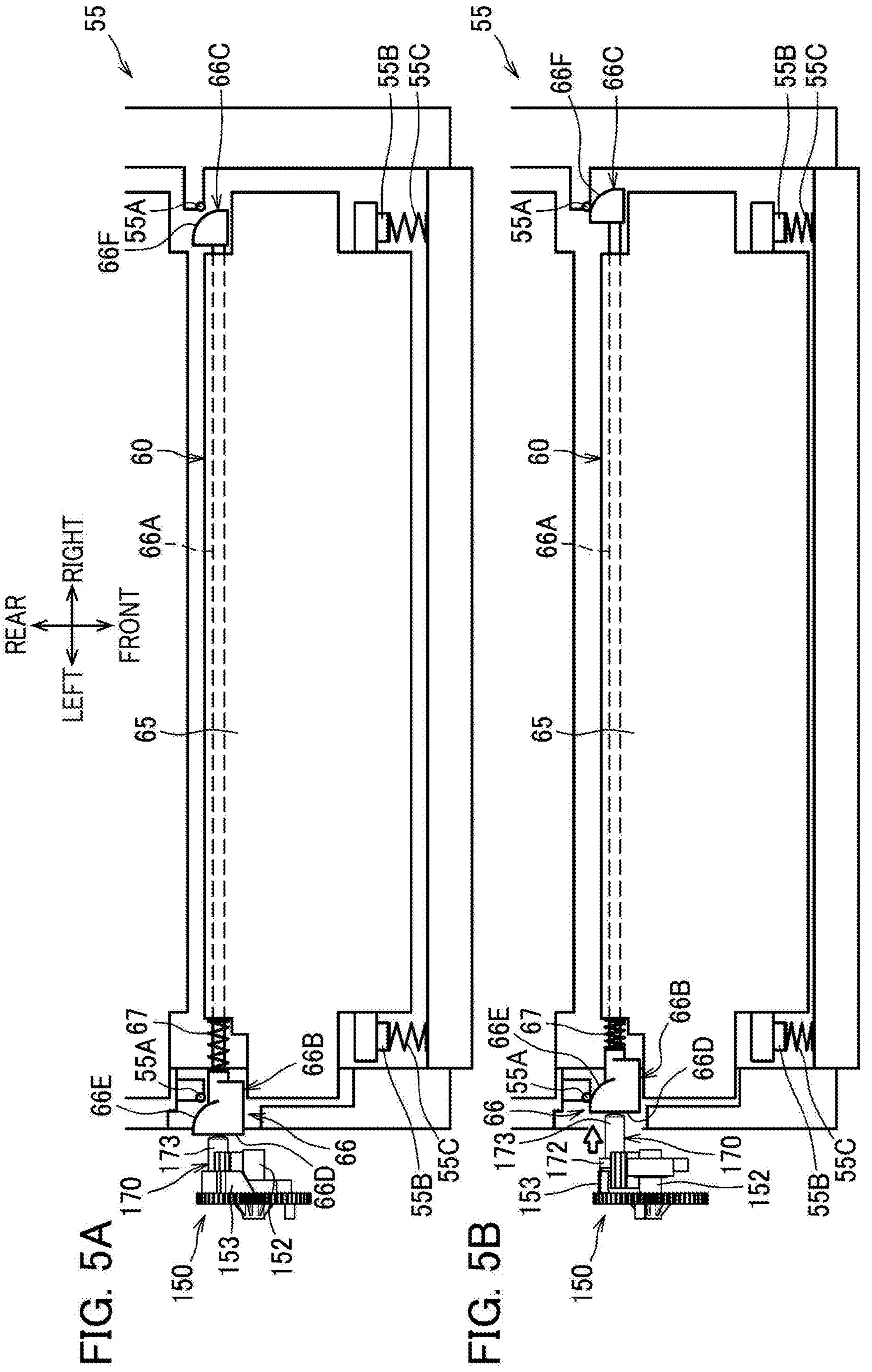
FIG. 5A is a view illustrating movement of a developing cartridge and particularly illustrating a state where a developing roller of the developing cartridge is at a contact position thereof.
FIG. 5B is a view illustrating movement of the developing cartridge and particularly illustrating a state where the developing roller of the developing cartridge is at a separated position thereof.

As illustrated in FIG. 5A, the drawer 55 has contact-receiving parts 55A, pressing members 55B, and springs 55C. The contact-receiving parts 55A are portions of the drawer 55 that are configured to be contacted by corresponding sliding members 66 (described later) of the developing cartridges 60. In the present embodiment, the contact-receiving parts 55A are rollers that are rotatable about vertical axes thereof. The pressing members 55B are urged rearward by the respective springs 55C. When a developing cartridge 60 is mounted on the drawer 55, the developing cartridge 60 is urged rearward by the corresponding pressing members 55B through urging forces of the corresponding springs 55C. As a result, the developing cartridge 60 moves into the developing position where the developing roller 61 contacts the corresponding photosensitive drum 50.

Each developing cartridge 60 has a case 65 that accommodates toner, and a sliding member 66. The sliding member 66 is configured to slide in the axial direction when pressed by the corresponding cam follower 170. The sliding member 66 includes a shaft 66A, a first contact member 66B, and a second contact member 66C. The shaft 66A is supported by the case 65 so as to be slidable in the axial direction relative thereto. The first contact member 66B is fixed to one end of the shaft 66A, and the second contact member 66C is fixed to the other end of the shaft 66A.

The first contact member 66B has a pressure-receiving surface 66D, and a sloped surface 66E. The second contact member 66C has a sloped surface 66F. The pressure-receiving surface 66D is a surface of the first contact member 66B that is to be pressed by the corresponding cam follower 170. The sloped surfaces 66E and 66F are sloped relative to the left-right direction. As illustrated in FIG. 5B, the sloped surfaces 66E and 66F are configured to contact the corresponding contact-receiving parts 55A when the sliding member 66 is pressed by the corresponding cam follower 170, thereby moving the corresponding developing cartridge 60 forward. As a result, the developing cartridge 60 moves into the non-developing position at which the developing roller 61 is separated from the photosensitive drum 50. A spring 67 is disposed between the first contact member 66B and the case 65. The spring 67 urges the sliding member 66 leftward.

As illustrated in FIG. 4, the separating cams 150 are end cams. Each separating cam 150 has a disc portion 151, a boss 152, and a cam portion 153.

The boss 152 extends in the axial direction from a center of the disc portion 151. The boss 152 has a cylindrical shape.

The image-forming apparatus 1 further includes four shafts 159, and a metal plate 15 (see FIG. 3). The metal plate 15 rotatably supports gears in each gear train. The shafts 159 are fixed to the metal plate 15. The separating cams 150 (the cam gears 115) are rotatably supported on the metal plate 15 by engaging the bosses 152 with the corresponding shafts 159.

The cam portions 153 protrude in the axial direction from the corresponding disc portions 151. Specifically, the cam portions 153 protrude toward one side in the axial direction (rightward) from the corresponding disc portions 151. The cam portion 153 protrudes in the axial direction from a surface of the corresponding disc portion 151 on an opposite side from the metal plate 15 (see FIG. 3).

As illustrated in FIG. 6, the cam portion 153 has a holding surface 153A, and a guiding surface 153B.

The holding surface 153A is configured to hold the corresponding cam follower 170 at the pressing position. The holding surface 153A is substantially parallel to a plane orthogonal to the rotational axis of the separating cam 150 (the cam gear 115).

The guiding surface 153B is configured to guide the corresponding cam follower 170 between the pressing position and the non-pressing position. The guiding surface 153B slopes relative to the plane orthogonal to the rotational axis of the separating cam 150 (the cam gear 115). Specifically, the guiding surface 153B slopes away from the disc portion 151 in the axial direction as extending toward the holding surface 153A in a rotational direction of the separating cam 150.

Figure 6A:
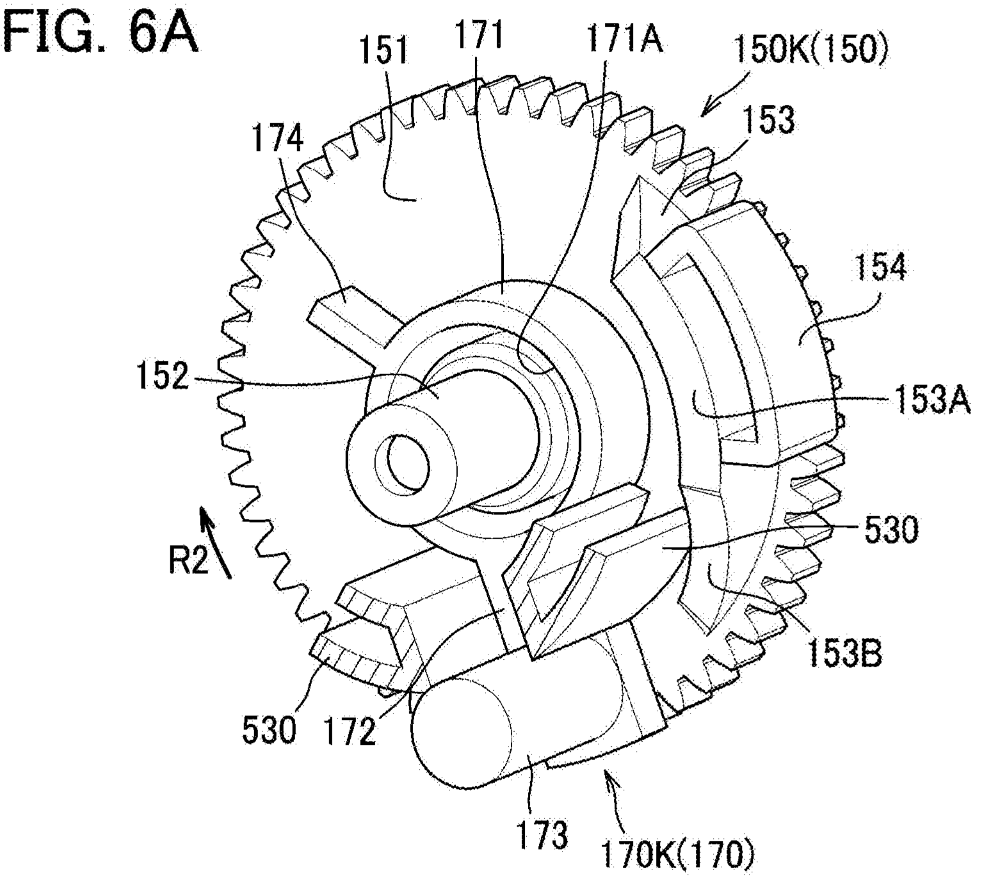
FIG. 6A is a perspective view of the separating cam and the cam follower at a non-pressing position thereof.
Figure 6B:
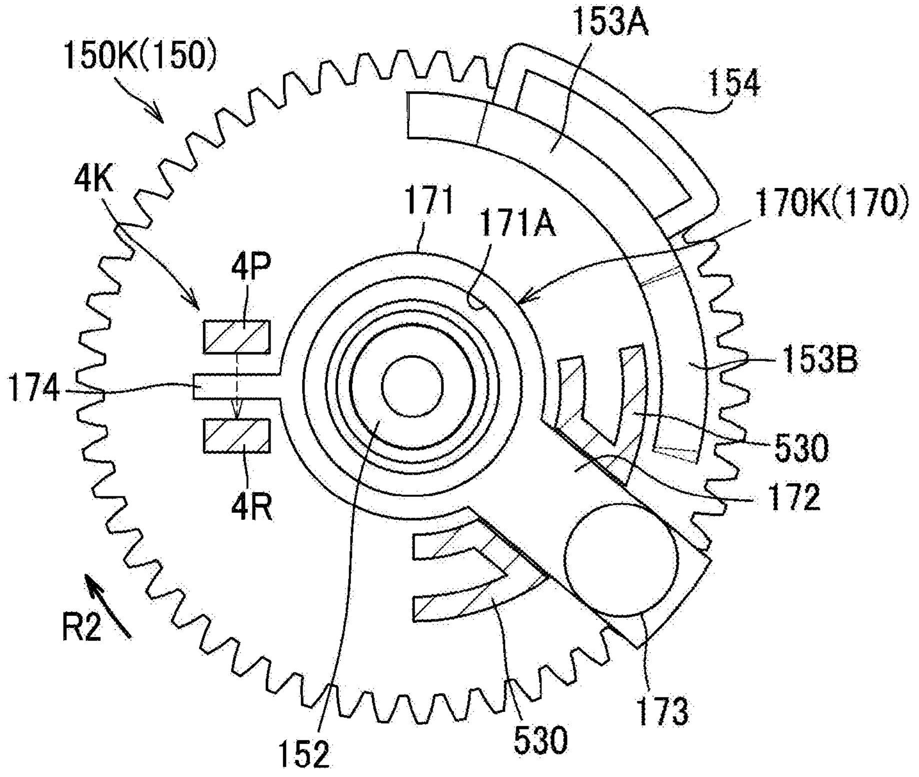
FIG. 6B is a side view of the separating cam and the cam follower at the non-pressing position.
Figure 7A:
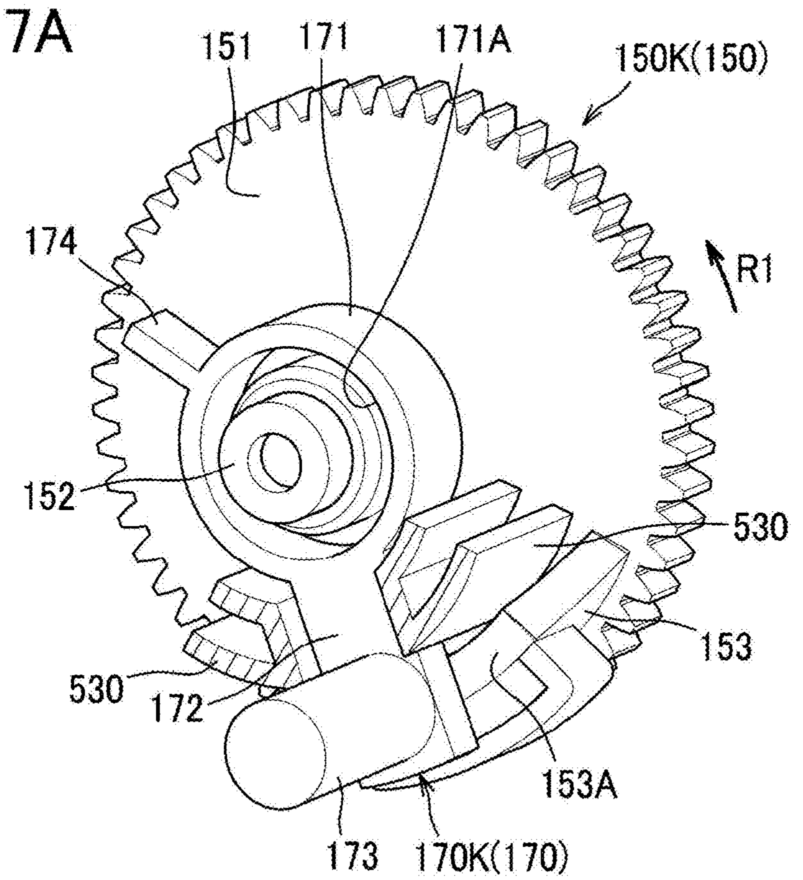
FIG. 7A is a perspective view of the separating cam and the cam follower at a pressing position thereof.
Figure 7B:
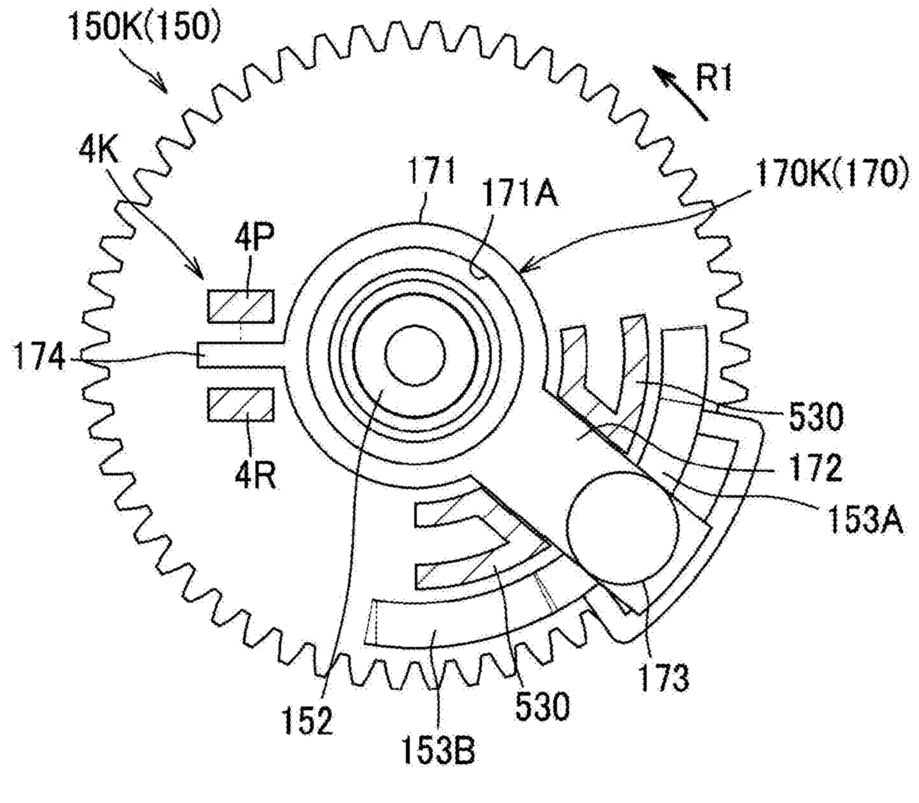
FIG. 7B is a side view of the separating cam and the cam follower at the pressing position.

The guiding surface 153B moves the corresponding cam follower 170 from the pressing position (FIGS. 7A and 7B) to the non-pressing position (FIGS. 6A and 6B) when the separating cam 150 rotates in a first rotating direction R1 illustrated in FIGS. 7A and 7B. The first rotating direction R1 is a direction in which the separating cam 150 rotates when the main motor M1 rotates forward.

The guiding surface 153B also moves the corresponding cam follower 170 from the non-pressing position (FIGS. 6A and 6B) to the pressing position (FIGS. 7A and 7B) when the separating cam 150 rotates in a second rotating direction R2 illustrated in FIGS. 6A and 6B. The second rotating direction R2 is a direction in which the separating cam 150 rotates when the main motor M1 is rotated in reverse. The second rotating direction R2 is opposite the first rotating direction R1.

Each cam follower 170 has a slide shaft 171, an arm 172, a pin 173, and a rib 174.

The slide shaft 171 is slidably movable in the axial direction. Specifically, the slide shaft 171 has a cylindrical shape. When engaged with the boss 152 of the corresponding separating cam 150, the slide shaft 171 can slide over the boss 152 in the axial direction. In this way, the cam follower 170 is movable in the axial direction between the non-pressing position (illustrated in FIGS. 6A and 6B) and the pressing position (illustrated in FIGS. 7A and 7B).

The arm 172 extends from the slide shaft 171 in a direction orthogonal to the axial direction. Specifically, the arm 172 extends radially outward from the slide shaft 171. The arm 172 has a plate shape.

The pin 173 extends in the axial direction from the arm 172. Specifically, the pin 173 extends toward the one side in the axial direction from a free end of the arm 172 which is a farther end from the slide shaft 171. The pin 173 is cylindrical in shape and has a curved convex surface on a distal end thereof (see FIGS. 5A and 5B). The distal end of the pin 173 is configured to push the corresponding developing cartridge 60 when the cam follower 170 has moved to the pressing position from the non-pressing position. Specifically, the distal end of the pin 173 pushes the pressure-receiving surface 66D of the sliding member 66 provided in the corresponding developing cartridge 60 (see FIG. 5B).

The rib 174 extends from the slide shaft 171 in a direction orthogonal to the axial direction. Specifically, the rib 174 extends outward from the slide shaft 171 in a radial direction of the same. The rib 174 extends in a direction different from the direction in which the arm 172 extends. In the present embodiment, the rib 174 extends forward from the slide shaft 171, while the arm 172 extends diagonally downward and rearward from the slide shaft 171.

Figure 8A:
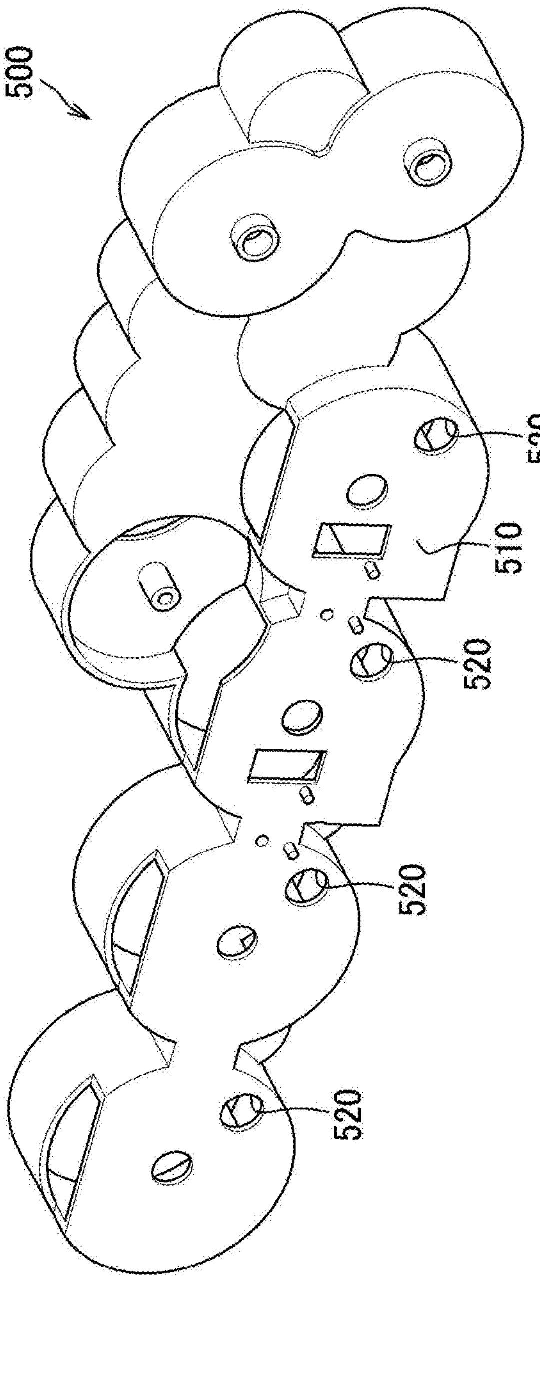
FIG. 8A is a perspective view of a gear cover.
Figure 8B:
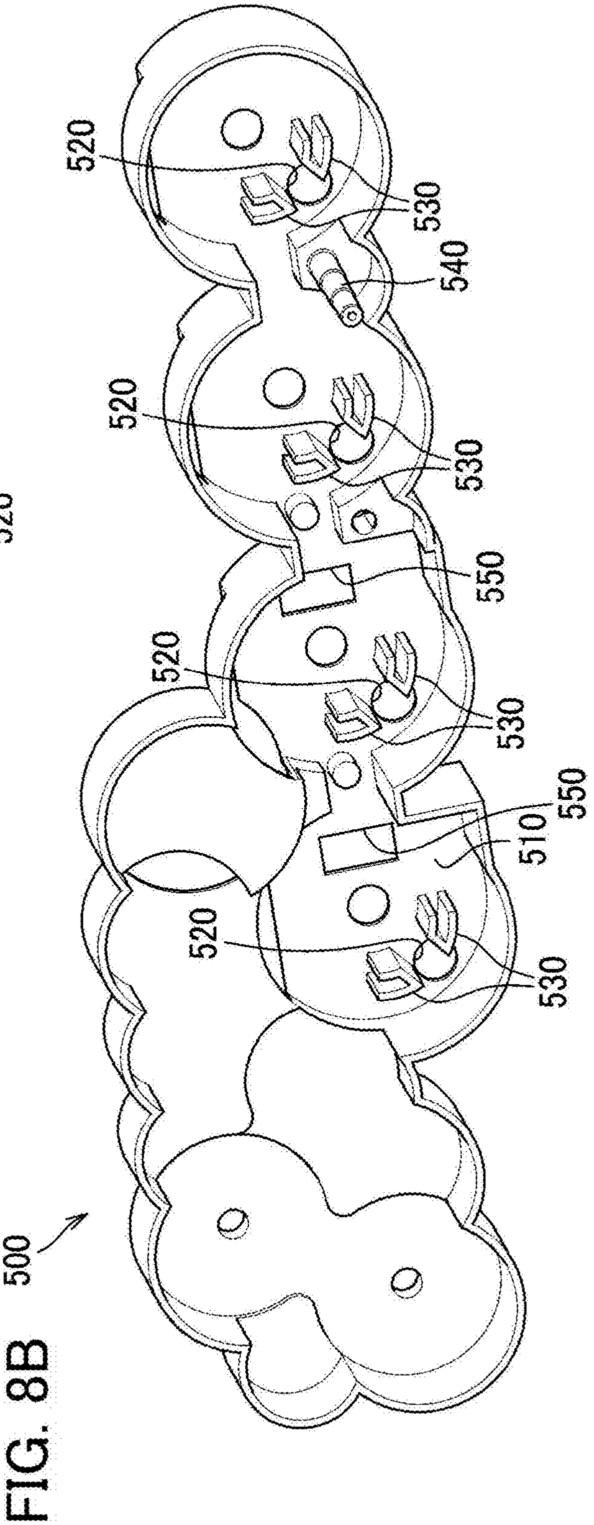
FIG. 8B is another perspective view of the gear cover.

The image-forming apparatus 1 further includes stoppers 530. Four sets of stoppers 530 are provided for the four cam followers 170 (see FIG. 4). The stoppers 530 restrict the respective cam followers 170 from rotating about the rotational axes of the separating cams 150 (cam gears 115). More specifically, the image-forming apparatus 1 includes a gear cover 500, and this gear cover 500 has the stoppers 530, as illustrated in FIGS. 8A and 8B.

The gear cover 500 is fixed to the metal plate 15 (see FIG. 3) and covers the separating cams 150 (cam gears 115) and the cam followers 170. The gear cover 500 has a cover wall 510. The cover wall 510 is a wall that covers the separating cams 150 and the cam followers 170. When fixed to the metal plate 15, the gear cover 500 opposes the metal plate 15 in the axial direction.

The stoppers 530 extend in the axial direction from the cover wall 510 toward the corresponding separating cam 150. The stoppers 530 are wall-like parts. The stoppers 530 in each set sandwich the arm 172 of the corresponding cam follower 170 from both sides in a circumferential direction of the slide shaft 171 (see FIGS. 6A to 7B). In this way, the stoppers 530 restrict the corresponding cam followers 170 from rotating about the corresponding bosses 152.

Figure 9A:
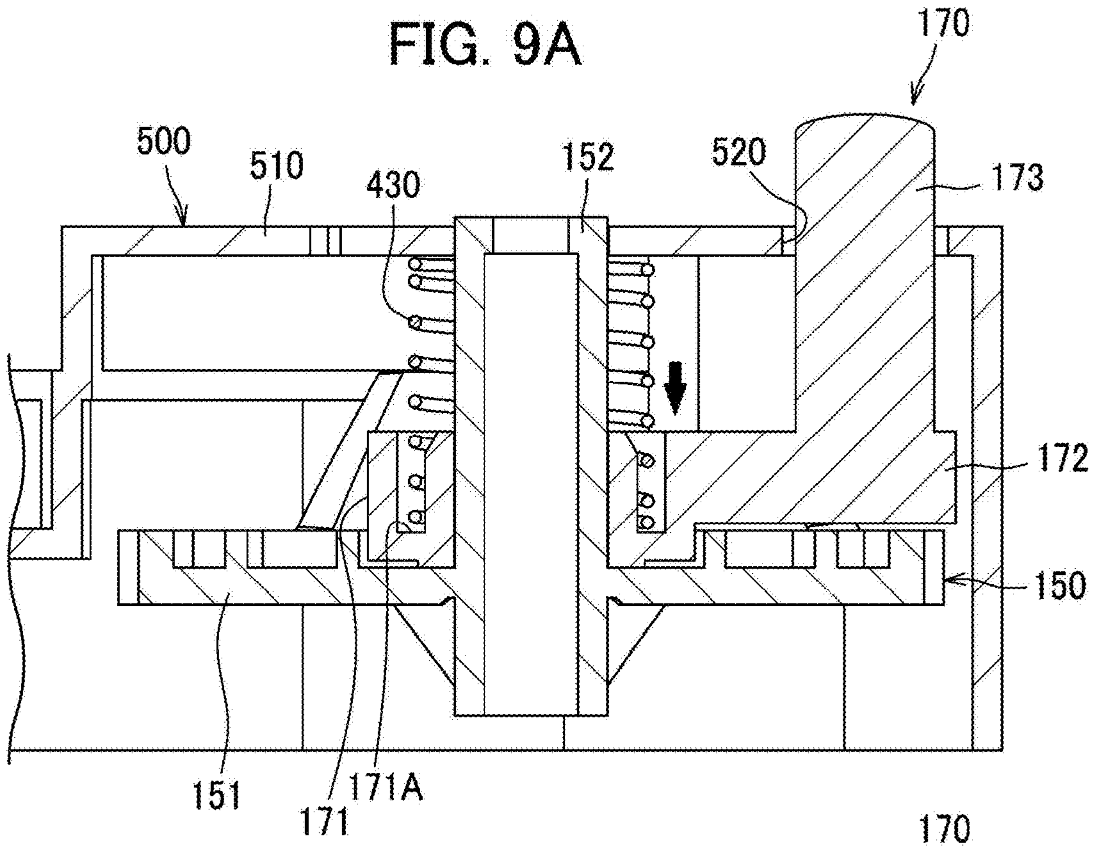
FIG. 9A is a cross-sectional view illustrating a state of the separating cam, cam follower, gear cover and a spring while cam follower is at the non-pressing position.
Figure 9B:
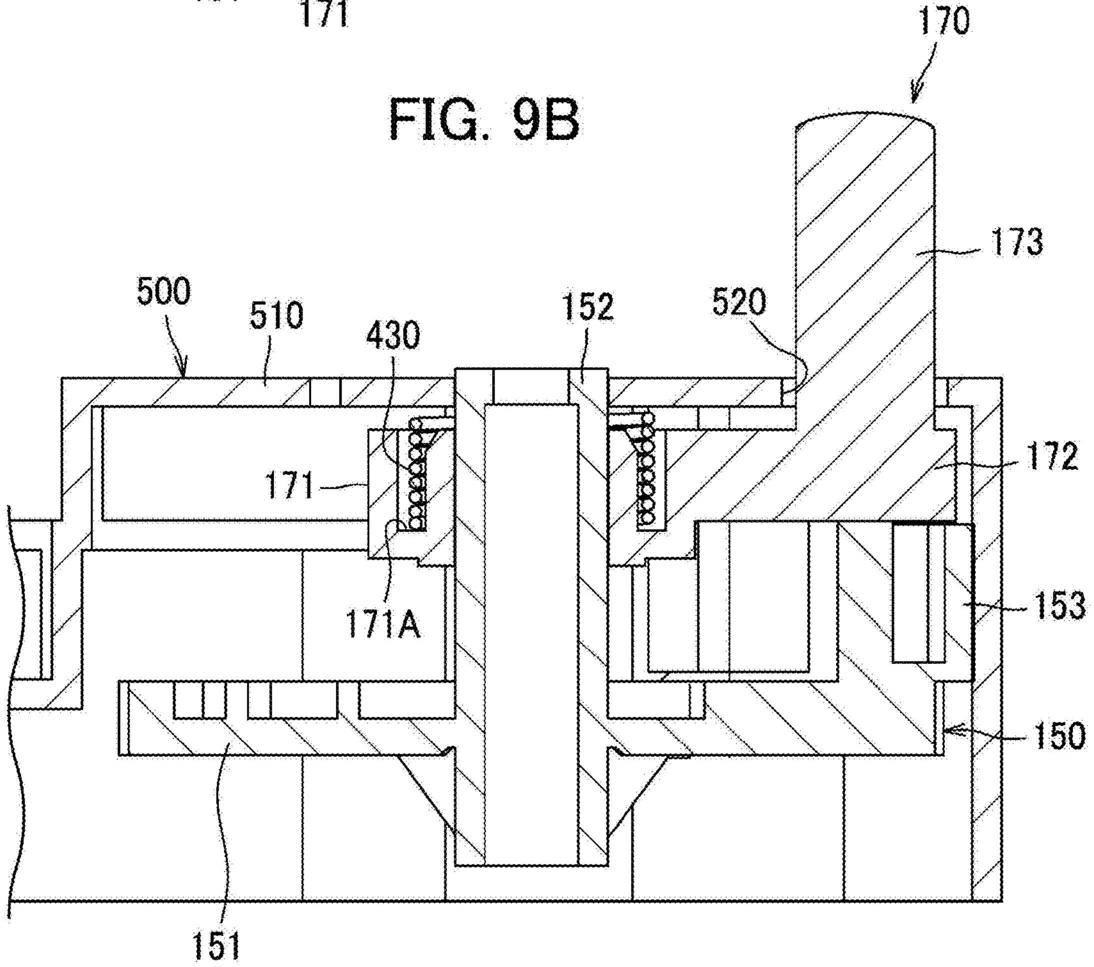
FIG. 9B is a cross-sectional view illustrating a state of the separating cam, cam follower, gear cover and the spring while cam follower is at the pressing position.

The cover wall 510 also has four insertion holes 520. As illustrated in FIG. 9, the insertion holes 520 are through-holes in which the pins 173 of the cam followers 170 are inserted.

The image-forming apparatus 1 further includes springs 430. Four springs 430 are provided for the four cam followers 170. Each spring 430 urges the corresponding cam follower 170 from the pressing position illustrated in FIG. 9B toward the non-pressing position illustrated in FIG. 9A. The springs 430 are compression coil springs, for example. Each spring 430 is positioned between the gear cover 500 and the slide shaft 171 of the corresponding cam follower 170. Specifically, each spring 430 is positioned between the cover wall 510 and the slide shaft 171 of the corresponding cam follower 170.

Each slide shaft 171 has a recess 171A. The recess 171A is an annular recess that opens toward the cover wall 510 in the axial direction. At least one end of the spring 430 is arranged inside the corresponding recess 171A. Due to the recess 171A formed in each slide shaft 171, positional displacement of the spring 430 can be restrained.

As illustrated in FIGS. 7A and 7B, the cam follower 170 is at the pressing position with the arm 172 held on the holding surface 153A of the corresponding separating cam 150 when the developing cartridge 60 is in the non-developing position, i.e., when the developing roller 61 is in the separated position.

The separating cam 150 is configured to rotate in the first rotating direction R1 when the main motor M1 is rotated forward. At this time, the arm 172 of the cam follower 170 is guided from the holding surface 153A to the guiding surface 153B, slides over the guiding surface 153B, and separates from the cam portion 153. As a result, the cam follower 170 is moved from the pressing position (illustrated in FIGS. 7A and 7B) to the non-pressing position (illustrated in FIGS. 6A and 6B) by the urging force of the corresponding spring 430 (see FIG. 9A).

Through this operation, the developing cartridge 60 moves from the non-developing position to the developing position, thereby moving the developing roller 61 from the separated position to the contact position. Thus, the separating cam 150 moves the developing roller 61 from the separated position to the contact position when the main motor M1 rotates forward.

Conversely, the separating cam 150 is configured to rotate in the second rotating direction R2 when the main motor M1 is rotated in reverse. At this time, the arm 172 of the cam follower 170 contacts the guiding surface 153B of the cam portion 153 and slides over the guiding surface 153B until contacting the holding surface 153A. As a result, the cam follower 170 is moved from the non-pressing position (illustrated in FIGS. 6A and 6B) to the pressing position (illustrated in FIGS. 7A and 7B).

Through the above operation, the developing cartridge 60 is pressed by the cam follower 170 and moved from the developing position to the non-developing position, thereby moving the developing roller 61 from the contact position to the separated position. Thus, the separating cam 150 moves the developing roller 61 from the contact position to the separated position when the main motor M1 is rotated in reverse.

Figure 10:
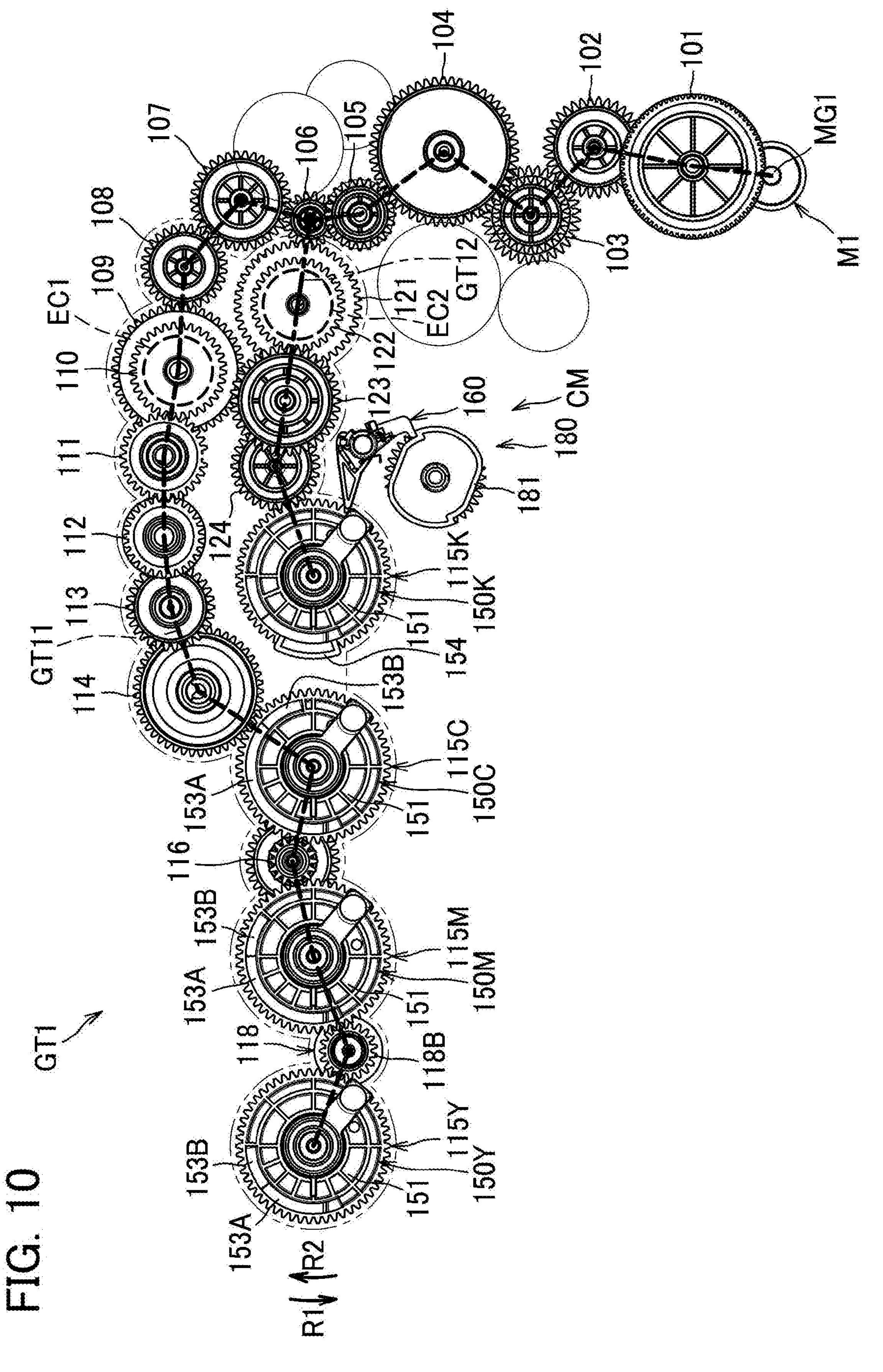
FIG. 10 is a view illustrating gears in a developing-roller separation gear train.

As illustrated in FIG. 10, the developing-roller separation gear train GT1 includes a first separation gear train GT11, and a second separation gear train GT12.

The first separation gear train GT11 is configured to transmit the drive force of the main motor M1 to the separating cams 150Y, 150M, and 150C.

The first separation gear train GT11 includes a gear 101, a gear 102, a gear 103, a gear 104, a gear 105, a gear 106, a gear 107, a gear 108, a gear 109, an electromagnetic clutch EC1 as an example of "electromagnetic clutch" of the disclosure, a gear 110, a gear 111, a gear 112, a gear 113, a gear 114, the cam gear 115C, a gear 116, the cam gear 115M, an idle gear 118, and the cam gear 115Y.

The gear 101 is a two-stage gear having a large-diameter gear and a small-diameter gear. The large-diameter gear of the gear 101 meshes with a motor gear MG1. The motor gear MG1 is provided on an output shaft of the main motor M1. In other words, the image-forming apparatus 1 includes the motor gear MG1. The motor gear MG1 is meshed with the large-diameter gear of the gear 101.

The gear 102 is meshed with the small-diameter gear of the gear 101. The gear 103 is a two-stage gear having a large-diameter gear and a small-diameter gear. The large-diameter gear of the gear 103 is meshed with the gear 102. The gear 104 is meshed with the small-diameter gear of the gear 103.

The gear 105 is a two-stage gear having a large-diameter gear and a small-diameter gear. The large-diameter gear of the gear 105 is meshed with the gear 104. The gear 106 is meshed with the small-diameter gear of the gear 105. The gear 107 is meshed with the gear 106. The gear 108 is meshed with the gear 107. The gear 109 is meshed with the gear 108.

The electromagnetic clutch EC1 can be switched in state between a transmission state and an interruption state. As an example, the electromagnetic clutch EC1 is in the transmission state when energized and in the interruption state when not energized. In the transmission state, the electromagnetic clutch EC1 transmits the drive force from the main motor M1 to each of the separating cams 150Y, 150M, and 150C. In the interruption state, the electromagnetic clutch EC1 does not transmit the drive force of the main motor M1 to the separating cams 150Y, 150M, and 150C. The electromagnetic clutch EC1 is configured to be controlled by the controller 2 (see FIG. 1).

The gear 110 rotates together with the gear 109 when the electromagnetic clutch EC1 is in the transmission state. The gear 110 is not driven to rotate when the electromagnetic clutch EC1 is in the interruption state, since the electromagnetic clutch EC1 does not transmit the drive force from the main motor M1. The gear 111 is meshed with the gear 110.

The gear 112 is a two-stage gear having a large-diameter gear and a small-diameter gear. The large-diameter gear of the gear 112 is meshed with the gear 111. The gear 113 is a two-stage gear having a large-diameter gear and a small-diameter gear. The large-diameter gear of the gear 113 is meshed with the small-diameter gear of the gear 112. The gear 114 is meshed with the small-diameter gear of the gear 113.

The cam gear 115C has the separating cam 150C. In other words, the separating cam 150C is configured of gear teeth around the outer circumference of the disc portion 151. The cam gear 115C is meshed with the gear 114. The gear 116 is meshed with the cam gear 115C.

The cam gear 115M has the separating cam 150M. In other words, the separating cam 150M is configured of gear teeth around the outer circumference of the disc portion 151. The cam gear 115M is meshed with the gear 116. The cam gear 115M receives the drive force of the main motor M1 from the cam gear 115C via the gear 116.

The idle gear 118 has a first gear part 118B. The first gear part 118B of the idle gear 118 is meshed with the cam gear 115M.

The cam gear 115Y has the separating cam 150Y. In other words, the separating cam 150Y is configured of gear teeth around the outer circumference of the disc portion 151. The cam gear 115Y is meshed with the first gear part 118B of the idle gear 118. The first gear part 118B of the idle gear 118 is meshed with both the cam gear 115Y and the cam gear 115M.

The separating cams 150Y, 150M, and 150C are rotatable in tandem. A length of the holding surface 153A in the rotating direction (first and second rotating directions R1, R2) of the separating cam 150 becomes sequentially larger in order of the separating cam 150Y, separating cam 150M, and separating cam 150C. Among the separating cams 150Y, 150M, and 150C, downstream ends of the respective holding surfaces 153A in the first rotating direction R1 are all in phase while the respective guiding surfaces 153B are all out of phase. Specifically, the guiding surface 153B on the separating cam 150Y is positioned downstream in the first rotating direction R1 relative to the guiding surface 153B on the separating cam 150M, and the guiding surface 153B on the separating cam 150M is positioned downstream in the first rotating direction R1 relative to the guiding surface 153B on the separating cam 150C.

As a result, when the main motor M1 rotates forward and the separating cams 150Y, 150M, and 150C rotate in the first rotating direction R1 from the state where the cam followers 170Y, 170M, and 170C are all at the pressing position, first the cam follower 170Y moves from the pressing position to the non-pressing position, moving the developing roller 61Y from the separated position to the contact position. Next, the cam follower 170M moves from the pressing position to the non-pressing position, moving the developing roller 61M from the separated position to the contact position. Lastly, the cam follower 170C moves from the pressing position to the non-pressing position, moving the developing roller 61C from the separated position to the contact position.

On the other hand, if the main motor M1 is rotated in reverse and the separating cams 150Y, 150M, and 150C are rotated in the second rotating direction R2 from the state where the cam followers 170Y, 170M, and 170C are all at the non-pressing position, first the cam follower 170C moves from the non-pressing position to the pressing position, moving the developing roller 61C from the contact position to the separated position. Next, the cam follower 170M moves from the non-pressing position to the pressing position, moving the developing roller 61M from the contact position to the separated position. Lastly, the cam follower 170Y moves from the non-pressing position to the pressing position, moving the developing roller 61Y from the contact position to the separated position.

Figure 11A:
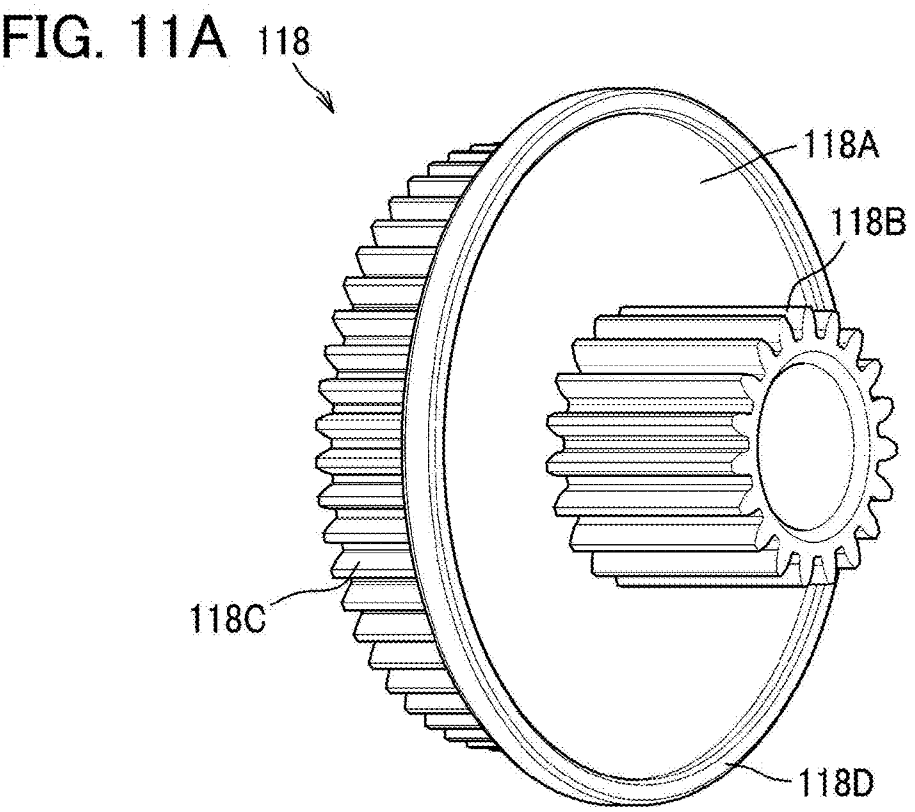
FIG. 11A is a perspective view of an idle gear in the developing-roller separation gear train.
Figure 11B:
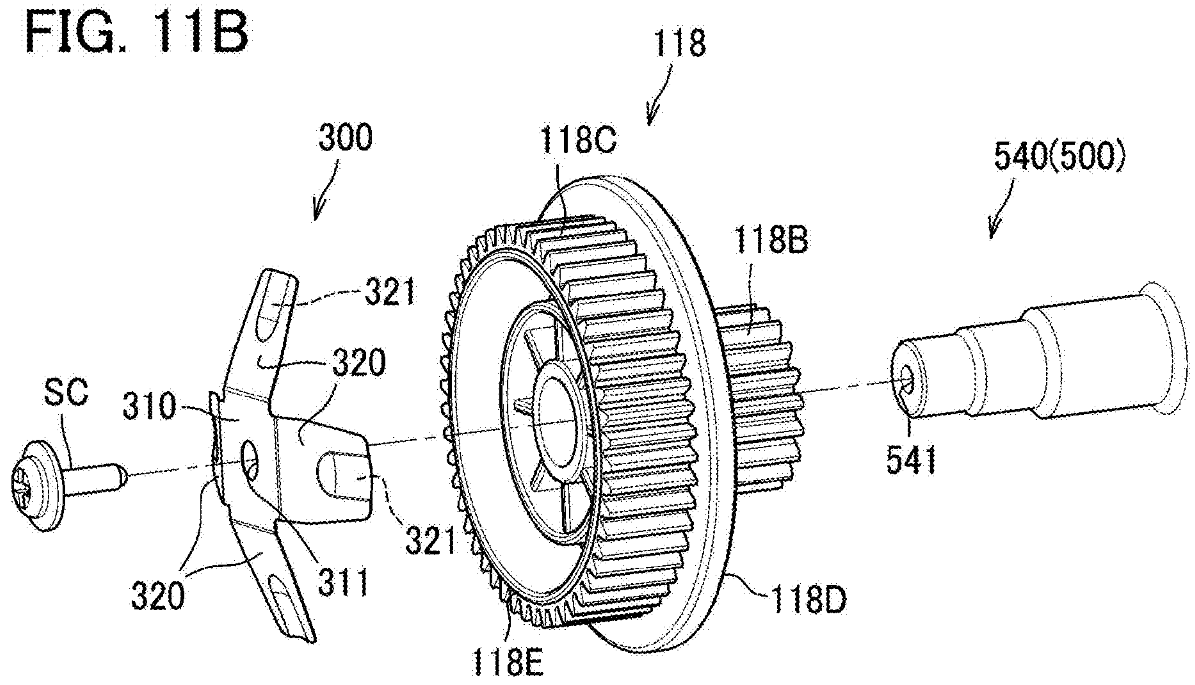
FIG. 11B is a perspective view illustrating assembly of the idle gear and a rotational resistance member to a shaft portion of the gear cover.

As illustrated in FIGS. 11A and 11B, the idle gear 118 has a disc portion 118A, the first gear part 118B, a second gear part 118C, a first rib 118D, and a second rib 118E.

The disc portion 118A is disc shaped. From the disc portion 118A, a cylindrical portion protrudes toward the one side in the axial direction. The first gear part 118B is formed around an outer circumference of this cylindrical portion on the disc portion 118A.

The second gear part 118C is formed around an outer circumference of the second rib 118E. The second gear part 118C defines a pitch circle diameter that is larger than a pitch circle diameter of the first gear part 118B.

The first rib 118D is an annular rib that protrudes from the disc portion 118A toward the one side in the axial direction. The second rib 118E is an annular rib that protrudes from the disc portion 118A toward the other side in the axial direction.

Figure 12:
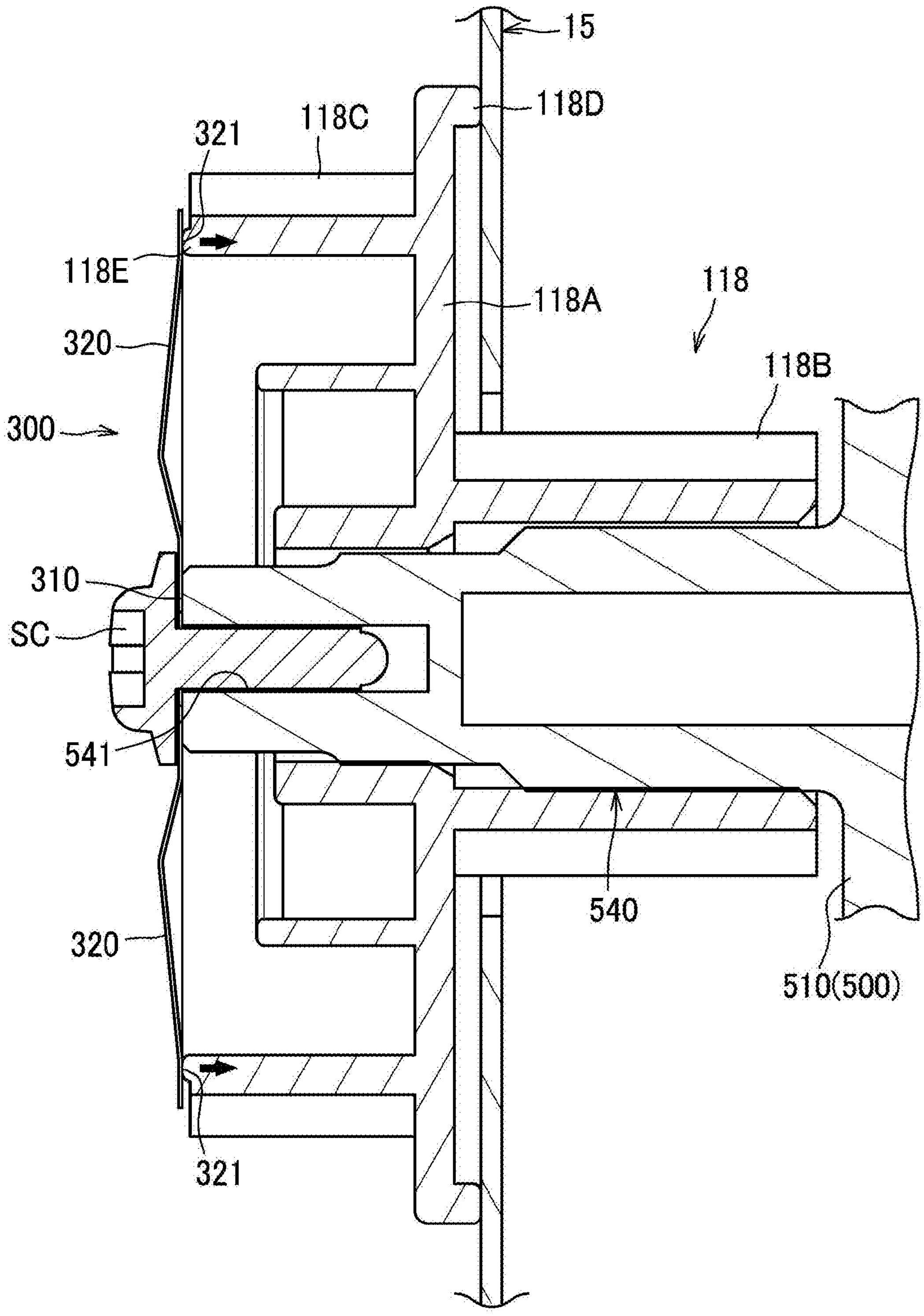
FIG. 12 is a cross-sectional view illustrating the idle gear, the rotational resistance member, the shaft portion of the gear cover, and the metal plate.

As illustrated in FIG. 12, the first rib 118D protrudes toward the metal plate 15 in the axial direction of the idle gear 118. The first rib 118D is formed along a circumferential end of the idle gear 118, and constitutes an outermost end of the idle gear 118 in a direction orthogonal to the rotational axis of the idle gear 118. Specifically, the first rib 118D is located on an outermost end of the disc portion 118A in a radial direction thereof. The first rib 118D is made to contact the metal plate 15 by a pressing force of a rotational resistance member 300 described later.

The second rib 118E protrudes away from the metal plate 15 in the axial direction of the idle gear 118. The second rib 118E has a distal edge that protrudes farther away from the metal plate 15 than the second gear part 118C does from the metal plate 15 in the axial direction of the idle gear 118. The second rib 118E has an inner diameter that is smaller than an inner diameter of the first rib 118D. The inner diameter of the second rib 118E is greater than the pitch circle diameter of the first gear part 118B.

The idle gear 118 is rotatable relative to the metal plate 15. Specifically, the gear cover 500 has a shaft portion 540 (also see FIG. 8B). The shaft portion 540 protrudes from the cover wall 510 toward the other side in the axial direction.

By engaging the idle gear 118 with the shaft portion 540, the idle gear 118 is rotatably supported by the gear cover 500. By fixing the gear cover 500 to the metal plate 15, the idle gear 118 is rotatable relative to the metal plate 15. In other words, the metal plate 15 rotatably supports the idle gear 118 through the gear cover 500.

The first gear part 118B and the cam gears 115Y and 115M in mesh with the first gear part 118B (see FIG. 10) are arranged on the one side of the metal plate 15 in the axial direction of the idle gear 118. The second gear part 118C is arranged on the other side of the metal plate 15 in the axial direction of the idle gear 118. The first rib 118D is also arranged on the other side of the metal plate 15 in the axial direction of the idle gear 118. The second rib 118E is similarly arranged on the other side of the metal plate 15 in the axial direction of the idle gear 118.

More specifically, the first gear part 118B and the cam gears 115Y and 115M are arranged on the right side of the metal plate 15 in FIG. 12. The second gear part 118C, the first rib 118D, and the second rib 118E are arranged on the left side of the metal plate 15 in FIG. 12.

As illustrated in FIG. 11B, the image-forming apparatus 1 further includes the rotational resistance member 300. The rotational resistance member 300 exerts a rotational resistance on the idle gear 118. Specifically, the rotational resistance member 300 exerts a rotational resistance on the idle gear 118 by pressing the idle gear 118 in the axial direction thereof.

The rotational resistance member 300 is a spring. Specifically, the rotational resistance member 300 is a leaf spring configured of a metal plate. The rotational resistance member 300 has a base portion 310, and four pressing portions 320.

The base portion 310 is a portion of the rotational resistance member 300 that is fixed to the shaft portion 540 of the gear cover 500 by a screw SC. The base portion 310 has a through-hole 311 in a center thereof. A shaft portion of the screw SC extends through the through-hole 311. The shaft portion 540 has a hole 541 into which the screw SC is screwed.

Figure 13:
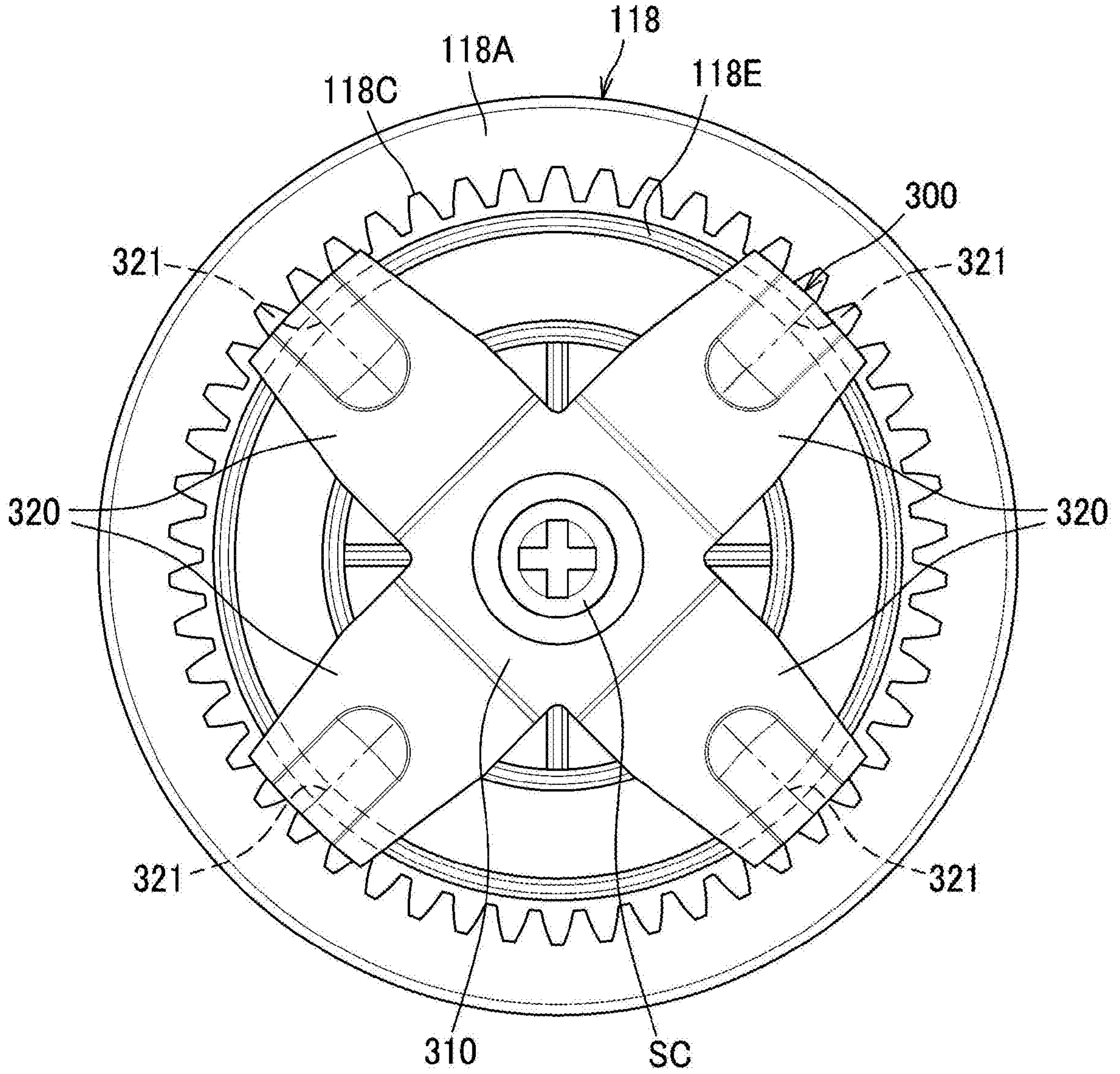
FIG. 13 is a view illustrating the idle gear and the rotational resistance member.

As illustrated in FIG. 13, the four pressing portions 320 are portions of the rotational resistance member 300 that press against the idle gear 118. The pressing portions 320 extend outward from the base portion 310. The four pressing portions 320 are arranged symmetrically with respect to the rotational axis of the idle gear 118. Specifically, the four pressing portions 320 are shifted in phase by 90° each in the rotating direction of the idle gear 118.

As illustrated in FIG. 12, the rotational resistance member 300 is arranged on the other side of the metal plate 15 in the axial direction of the idle gear 118. In a state where the rotational resistance member 300 is fixed to the shaft portion 540, the four pressing portions 320 contact the idle gear 118 and press the idle gear 118 from the other side toward the one side in the axial direction of the idle gear 118.

Specifically, the four pressing portions 320 of the rotational resistance member 300 contact the second rib 118E of the idle gear 118 and press the idle gear 118 from the other side toward the one side in the axial direction of the idle gear 118. Through this contact, the first rib 118D of the idle gear 118 is pressed against the metal plate 15.

Since the inner diameter of the second rib 118E is larger than the pitch circle diameter of the first gear part 118B, the pressing portions 320 press against the idle gear 118 at positions radially outside the pitch circle of the first gear part 118B.

As illustrated in FIG. 13, each of the pressing portions 320 has a contact part 321. The contact part 321 is convex toward the one side in the axial direction of the idle gear 118. The contact part 321 has an arcuate curve in cross section. Each pressing portion 320 contacts the second rib 118E along a ridge like portion of the contact part 321 (indicated by two-dot chain lines in FIG. 13). The ridge-like portion of each contact part 321 extends in the same direction in which the pressing portion 320 extends from the main casing 10 so as to intersect the second rib 118E.

By contacting the second rib 118E with these contact parts 321, the pressing portions 320 can contact the second rib 118E uniformly, even if the position of the rotational resistance member 300 shifts slightly offset in a direction orthogonal to the axial direction of the idle gear 118. Thus, the pressing portions 320 can apply a uniform load to the idle gear 118.

The rotational resistance member 300 is covered by a non-illustrated cover. Stoppers (not illustrated) provided on this non-illustrated cover restrict the rotational resistance member 300 from rotating about the rotational axis of the idle gear 118.

As illustrated in FIG. 10, the second separation gear train GT12 is configured to receive the drive force of the main motor M1 from the first separation gear train GT11 and transmit this drive force to the separating cam 150K. The second separation gear train GT12 includes a gear 121, an electromagnetic clutch EC2 as an example of the electromagnetic clutch of the disclosure, a gear 122, a gear 123, a gear 124, and the cam gear 115K.

The gear 121 is meshed with the gear 106 of the first separation gear train GT11.

The electromagnetic clutch EC2 can be switched in state between a transmission state and an interruption state. For example, the electromagnetic clutch EC2 is in the transmission state when energized and in the interruption state when not energized. In the transmission state, the electromagnetic clutch EC2 transmits the drive force from the main motor M1 to the separating cam 150K. In the interruption state, the electromagnetic clutch EC2 does not transmit the drive force from the main motor M1 to the separating cam 150K. The electromagnetic clutch EC2 is configured to be controlled by the controller 2 (see FIG. 1).

The gear 122 rotates together with the gear 121 when the electromagnetic clutch EC2 is in the transmission state. When the electromagnetic clutch EC2 is in the interruption state, the gear 122 is not driven since the electromagnetic clutch EC2 does not transmit the drive force from the main motor M1.

The gear 123 is a two-stage gear having a large-diameter gear and a small-diameter gear. The large-diameter gear of the gear 123 is meshed with the gear 122.

The gear 124 is meshed with the small-diameter gear of the gear 123. The cam gear 115K has the separating cam 150K. That is, the separating cam 150K is configured of gear teeth along the outer circumference of the disc portion 151. The cam gear 115K is meshed with the gear 124.

Figure 14:
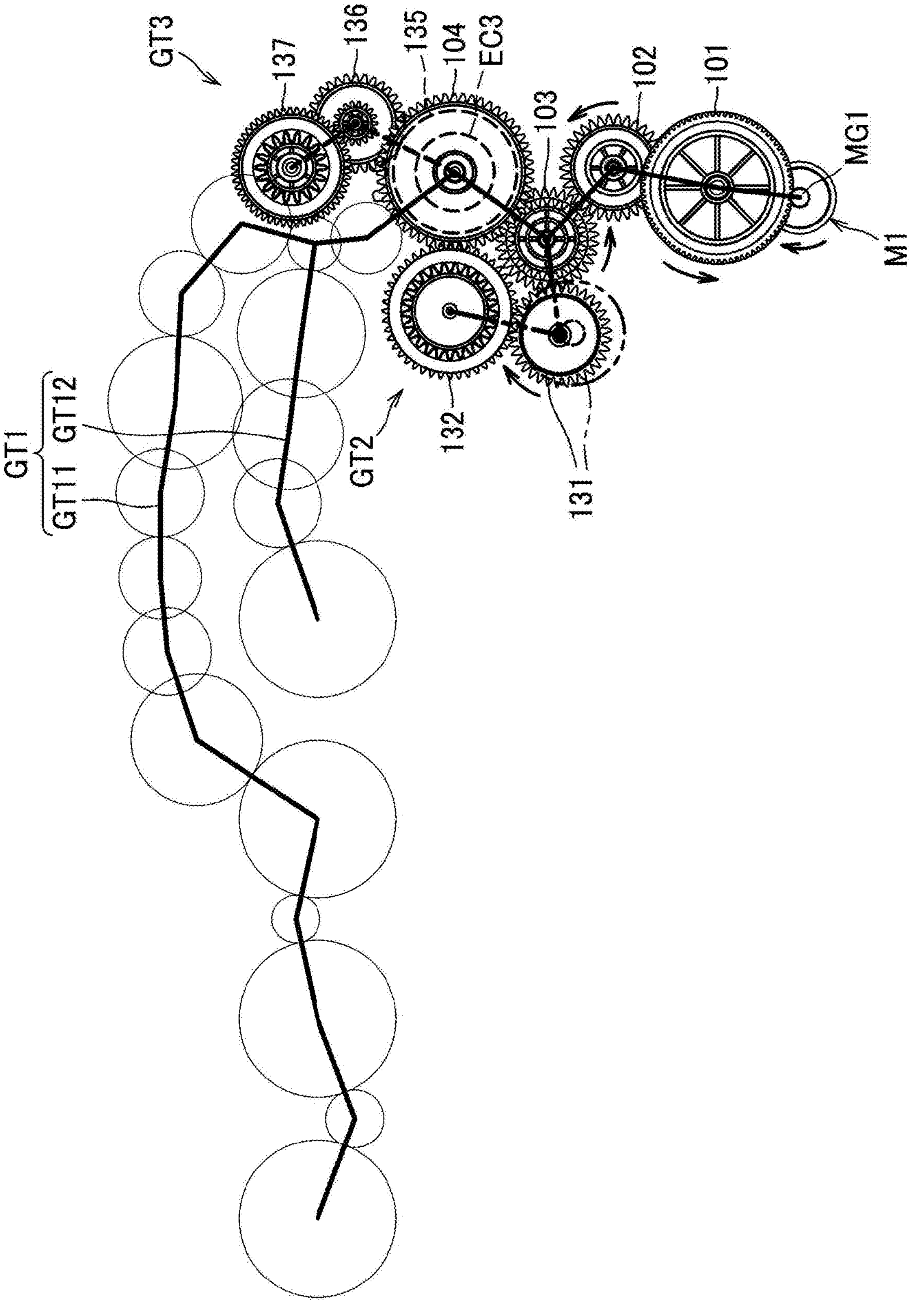
FIG. 14 is a view illustrating gears in a fixing-device drive gear train and a nip-pressure adjustment gear train.

As illustrated in FIG. 14, the fixing-device drive gear train GT2 includes a movable gear 131, and an output gear 132. The output gear 132 is an example of "first gear" of the disclosure. The movable gear 131 is an example of "movable gear" of the disclosure.

The movable gear 131 receives the drive force from the main motor M1. The movable gear 131 is in mesh with the large-diameter gear of the gear 103 in the first separation gear train GT11. The movable gear 131 can move relative to the output gear 132 between a transmission position indicated by solid lines in FIG. 14, and a non-transmission position indicated by phantom lines in FIG. 14. Specifically, the movable gear 131 is angularly rotatable around the gear 103 between the transmission position and the non-transmission position.

In the transmission position, the movable gear 131 is meshed with the output gear 132 and transmits the drive force of the main motor M1 to the output gear 132. In the non-transmission position, the movable gear 131 is separated from the output gear 132 and does not transmit the drive force to the same. The movable gear 131 moves to the transmission position when the main motor M1 rotates forward and moves to the non-transmission position when the main motor M1 rotates in reverse.

The output gear 132 is configured to output the drive force for the fixing device 80. Specifically, the output gear 132 outputs the drive force for the heating roller 81A. The output gear 132 is a two-stage gear having a large-diameter gear and a small-diameter gear. The large-diameter gear of the output gear 132 meshes with the movable gear 131 when the movable gear 131 is in the transmission position.

Figure 15:
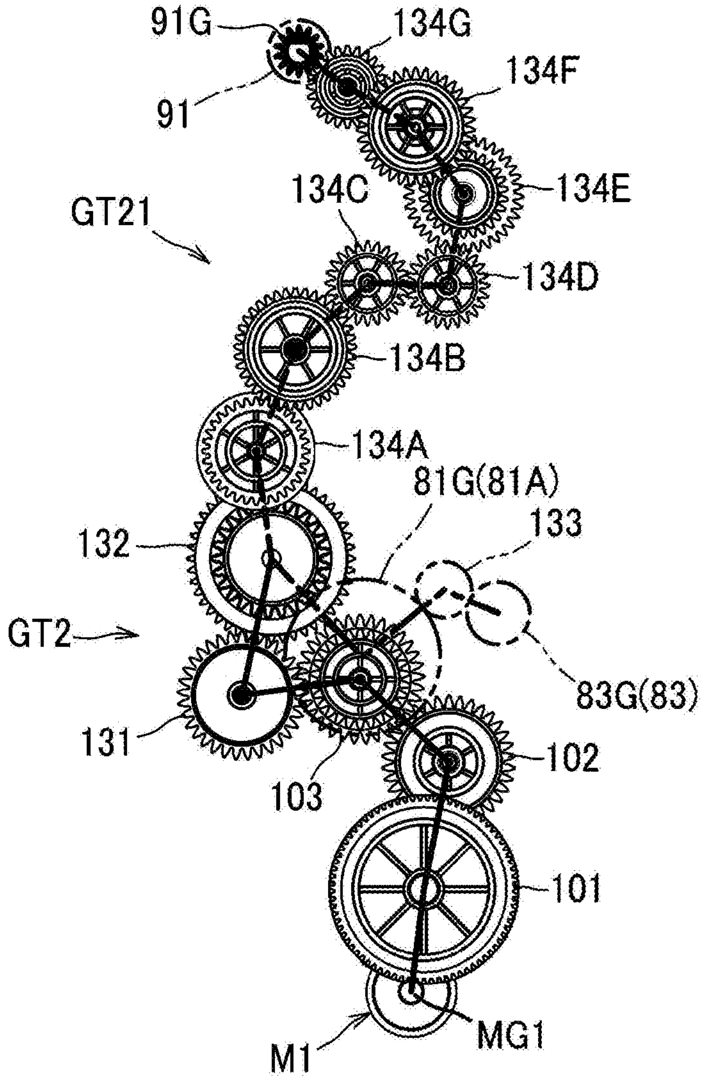
FIG. 15 is a view illustrating gears in the fixing-device drive gear train, a first discharge roller gear, a second discharge roller gear, and gears in a discharge roller drive gear train.

As illustrated in FIG. 15, the heating roller 81A has a heating roller gear 81G fixed to one end thereof. The small-diameter gear of the output gear 132 is meshed with the heating roller gear 81G. The pressure unit 82 (the pressure roller) of the fixing device 80 is configured to follow the rotation of the heating roller 81A.

The first discharge rollers 83 and the second discharge rollers 91 are configured to receive the drive force of the main motor M1 from the fixing-device drive gear train GT2.

One of the first discharge rollers 83 has a first discharge roller gear 83G fixed to one end of thereof. One of the second discharge rollers 91 has a second discharge roller gear 91G fixed to one end thereof.

The image-forming apparatus 1 further includes a gear 133, and a discharge roller drive gear train GT21.

The gear 133 is meshed with the heating roller gear 81G, and the first discharge roller gear 83G is meshed with the gear 133. With this configuration, the first discharge rollers 83 rotate when receiving the drive force of the main motor M1 from the output gear 132 of the fixing-device drive gear train GT2 via the heating roller gear 81G and the gear 133.

The discharge roller drive gear train GT21 includes a gear 134A, a gear 134B, a gear 134C, a gear 134D, a gear 134E, a gear 134F, and a gear 134G.

The gear 134A is meshed with the small-diameter gear of the output gear 132. The gear 134B is meshed with the gear 134A.

The gear 134C is meshed with the gear 134B. The gear 134D is meshed with the gear 134C. The gear 134E is a two-stage gear having a large-diameter gear and a small-diameter gear. The large-diameter gear of the gear 134E is meshed with the gear 134D.

The gear 134F is a two-stage gear having a large-diameter gear and a small-diameter gear. The large-diameter gear of the gear 134F is meshed with the small-diameter gear of the gear 134E. The gear 134G is meshed with the small-diameter gear of the gear 134F.

The second discharge roller gear 91G is meshed with the gear 134G. With this arrangement, the second discharge rollers 91 rotate upon receiving the drive force of the main motor M1 from the output gear 132 of the fixing-device drive gear train GT2 via the discharge roller drive gear train GT21.

Figure 16A:
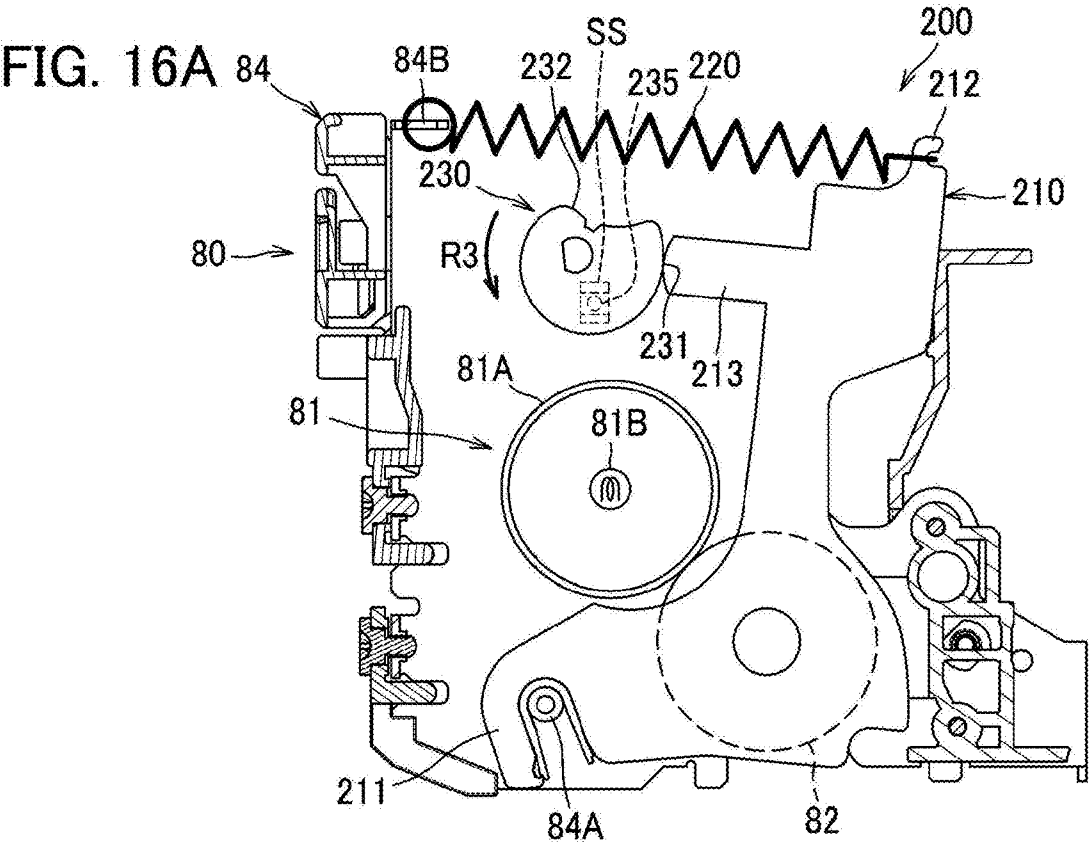
FIG. 16A is a view schematically illustrating a nip-pressure adjusting mechanism when a nip pressure is a low nip pressure.
Figure 16B:
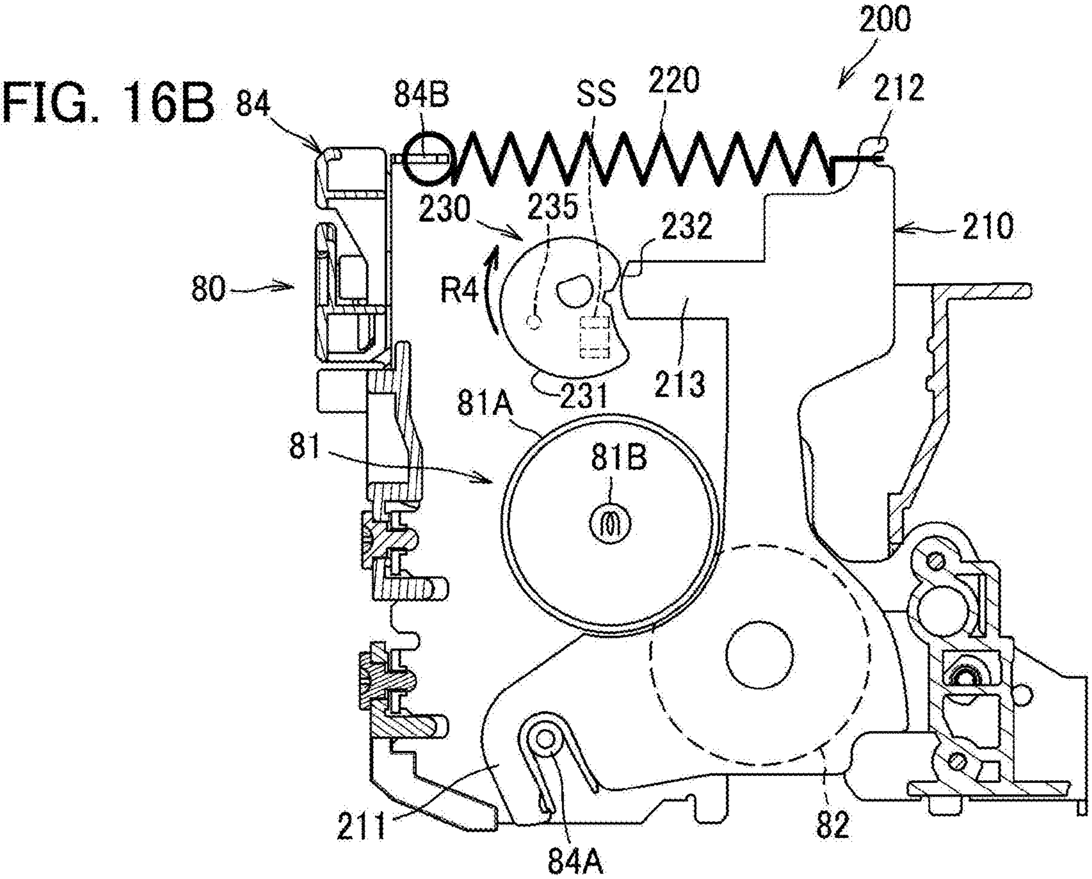
FIG. 16B is a view schematically illustrating the nip-pressure adjusting mechanism when the nip pressure is a high nip pressure.

The nip-pressure adjusting mechanism 200 illustrated in FIGS. 16A and 16B is configured to receive the drive force from the main motor M1 and switch the nip pressure between the heating unit 81 and the pressure unit 82 based on the drive force. Specifically, the nip-pressure adjusting mechanism 200 is configured to switch the nip pressure between the heating roller 81A and the pressure unit 82 between a low nip pressure illustrated in FIG. 16A and a high nip pressure illustrated in FIG. 16B. Here, the low nip pressure corresponds to "second nip pressure" of the disclosure, and the high nip pressure corresponds to "first nip pressure" of the disclosure.

The low nip pressure is lower (smaller) than the high nip pressure. In this embodiment, the low nip pressure is applied in a standby state prior to executing printing, while the high nip pressure is used when executing printing. In the present embodiment, the heating unit 81 and pressure unit 82 are in contact with each other when the low nip pressure is applied.

The nip-pressure adjusting mechanism 200 is provided in the fixing device 80. The fixing device 80 further includes a fixing device frame 84 (see FIGS. 16A and 16B), in addition to the nip-pressure adjusting mechanism 200.

The fixing device frame 84 supports the heating unit 81. Specifically, the fixing device frame 84 rotatably supports the heating roller 81A. On each side in the axial direction, the fixing device frame 84 has a shaft part 84A, and a spring engagement part 84B.

The nip-pressure adjusting mechanism 200 includes arms 210, springs 220, and the nip-pressure adjusting cams 230. One set configured of one arm 210, one spring 220, and one nip pressure adjusting cam 230 is provided on each side of the pressure unit 82 in the axial direction. The nip-pressure adjusting cams 230 is an example of "first cam" of the disclosure. The nip-pressure adjusting cams 230 is also another example of "movable member" of the disclosure.

The arms 210 rotatably support the pressure unit 82 (the pressure roller). Each arm 210 has a first end 211, a second end 212, and a cam contact part 213. The arm 210 is rotatably supported by the fixing device frame 84 by engagement of the first end 211 of the arm 210 with the shaft part 84A of the fixing device frame 84. The cam contact part 213 extends toward the nip pressure adjusting cam 230 at a position on the arm 210 between the first end 211 and second end 212.

The springs 220 urge the pressure unit 82 toward the heating unit 81. The springs 220 are tension coil springs, for example. Each spring 220 has one end engaged with the corresponding spring engagement part 84B of the fixing device frame 84, and another end engaged with the second end 212 of the corresponding arm 210.

The nip-pressure adjusting cams 230 function to switch the nip pressure between the heating unit 81 and pressure unit 82 between the low nip pressure and the high nip pressure in response to the drive force received from the main motor M1. Specifically, the nip-pressure adjusting cams 230 switch the nip pressure between the heating roller 81A and the pressure unit 82 (the pressure roller) between the low nip pressure illustrated in FIG. 16A and the high nip pressure illustrated in FIG. 16B according to the drive force received from the main motor M1.

The nip-pressure adjusting cams 230 are pivotably supported by the fixing device frame 84. Specifically, the nip-pressure adjusting cams 230 is pivotable about an axis parallel to the rotational axis of the heating roller 81A. The nip-pressure adjusting cams 230 is pivotable between a first position illustrated in FIG. 16A and a second position illustrated in FIG. 16B. The nip pressure adjusting cam 230 is a plate cam. Specifically, the nip-pressure adjusting cams 230 has an outer circumferential surface configured of a first part 231, and a second part 232.

The first part 231 contacts the cam contact part 213 of the corresponding arm 210 when the nip pressure adjusting cam 230 is in the second position illustrated in FIG. 16A. At this time, the nip pressure between the heating unit 81 and pressure unit 82 is the low nip pressure.

The second part 232 opposes the cam contact part 213 of the corresponding arm 210 when the nip pressure adjusting cam 230 is in the first position illustrated in FIG. 16B. At this time, the second part 232 is separated from the cam contact part 213. When the nip-pressure adjusting cams 230 are in the first position, the nip pressure between the heating unit 81 and pressure unit 82 is the high nip pressure.

The nip-pressure adjusting mechanism 200 switches the nip pressure between the heating unit 81 and pressure unit 82 from the low nip pressure to the high nip pressure when the nip-pressure adjusting cams 230 pivot approximately 270 degrees in a third rotating direction R3 from the state illustrated in FIG. 16A and move from the second position to the first position illustrated in FIG. 16B. The third rotating direction R3 is a direction in which the nip-pressure adjusting cams 230 rotate when the main motor M1 rotates forward.

Further, the nip-pressure adjusting mechanism 200 switches the nip pressure between the heating unit 81 and pressure unit 82 from the high nip pressure to the low nip pressure when the nip-pressure adjusting cams 230 pivot in a fourth rotating direction R4 from the state illustrated in FIG. 16B and move from the first position to the second position illustrated in FIG. 16A. The fourth rotating direction R4 is a direction in which the nip-pressure adjusting cams 230 rotate when the main motor M1 rotates in reverse. The fourth rotating direction R4 is opposite the third rotating direction R3.

The image-forming apparatus 1 further includes a sensor SS. The sensor SS is configured to detect that the nip-pressure adjusting cams 230 are at the second position. The sensor SS is a photo interrupter, for example, similar to sensor 4K and 4C described later. The sensor SS has a light-emitting element and a light-receiving element.

Each nip pressure adjusting cam 230 also has a protrusion 235. The protrusion 235 blocks light emitted from the light-emitting element of the sensor SS when the nip pressure adjusting cam 230 is in the second position. When the nip pressure adjusting cam 230 is in the first position, the protrusion 235 is separated from light emitted from the light-emitting element, allowing the light-receiving element to receive the light from the light-emitting element. As an alternative, the sensor SS may be configured to detect that the nip-pressure adjusting cams 230 are in the first position.

As illustrated in FIG. 14, the nip-pressure adjustment gear train GT3 includes an electromagnetic clutch EC3, a clutch connection gear 135, a gear 136, and a gear 137. The electromagnetic clutch EC3 is an example of "switching mechanism" in the second gear train of the disclosure.

The electromagnetic clutch EC3 can be switched in state between a transmission state and an interruption state. For example, the electromagnetic clutch EC3 is in the transmission state when energized and in the interruption state when not energized. In the transmission state, the electromagnetic clutch EC3 transmits the drive force of the main motor M1 from the developing-roller separation gear train GT1 to the nip-pressure adjustment gear train GT3. That is, in the transmission state, the electromagnetic clutch EC3 transmits the drive force from the main motor M1 to the nip-pressure adjusting cams 230. In the interruption state, the electromagnetic clutch EC3 does not transmit the drive force of the main motor M1 from the developing-roller separation gear train GT1 to the nip-pressure adjustment gear train GT3. That is, in the interruption state, the electromagnetic clutch EC3 does not transmit the drive force from the main motor M1 to the nip-pressure adjusting cams 230. The electromagnetic clutch EC3 is configured to be controlled by the controller 2 (see FIG. 1).

The clutch connection gear 135 is rotatable together with the gear 104 of the developing-roller separation gear train GT1 when the electromagnetic clutch EC3 is in the transmission state. The clutch connection gear 135 rotates coaxially with the gear 104. The clutch connection gear 135 is not driven when the electromagnetic clutch EC3 is in the interruption state, since the electromagnetic clutch EC3 does not transmit the drive force from the main motor M1.

The gear 136 is a two-stage gear having a large-diameter gear and a small-diameter gear. The large-diameter gear of the gear 136 is meshed with the clutch connection gear 135. The gear 137 is a two-stage gear having a large-diameter gear and a small-diameter gear. The large-diameter gear of the gear 137 is meshed with the small-diameter gear of the gear 136. The nip-pressure adjusting cams 230 of the nip-pressure adjusting mechanism 200 (see FIGS. 16A and 16B) rotate when receiving the drive force of the main motor M1 from the small-diameter gear of the gear 137.

Figure 17:
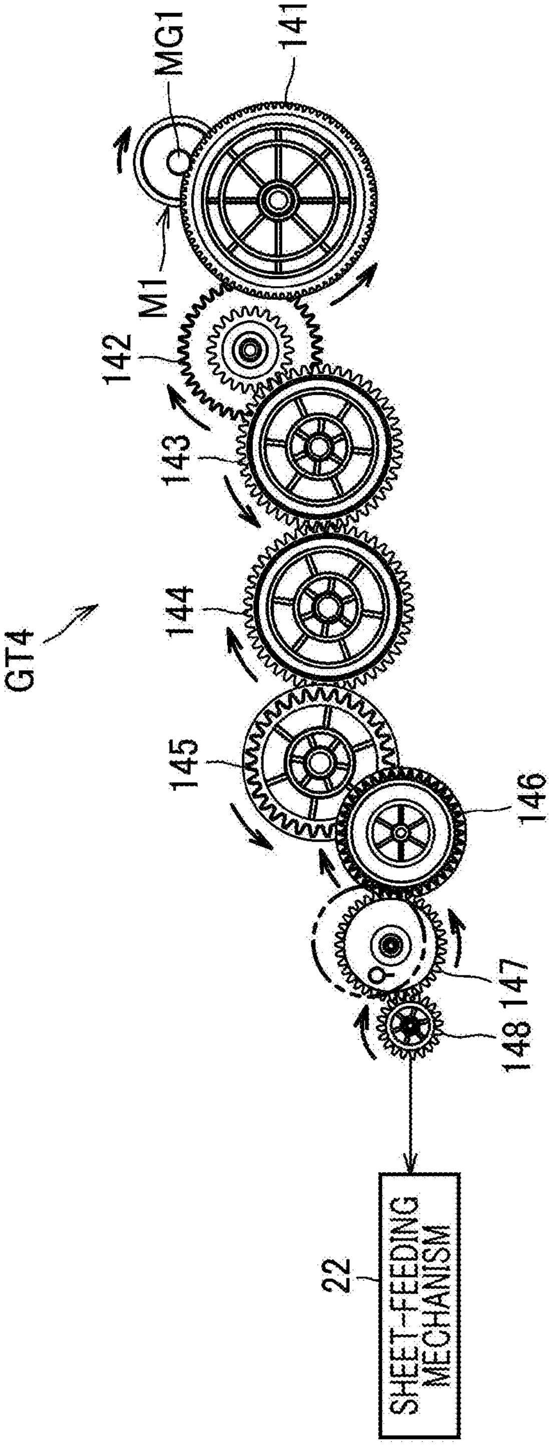
FIG. 17 is a view illustrating gears in a sheet feed gear train.

As illustrated in FIG. 17, the sheet feed gear train GT4 includes a gear 141, a gear 142, a gear 143, a gear 144, a gear 145, a gear 146, a second movable gear 147, and a second output gear 148.

The gear 141 is a two-stage gear having a large-diameter gear and a small-diameter gear. The large-diameter gear of the gear 141 is meshed with the motor gear MG1. In other words, the motor gear MG1 is meshed with the large-diameter gear of the gear 141.

The gear 142 is a two-stage gear having a large-diameter gear and a small-diameter gear. The large-diameter gear of the gear 142 is meshed with the small-diameter gear of the gear 141. The gear 143 is meshed with the small-diameter gear of the gear 142. The gear 144 is meshed with the gear 143.

The gear 145 is meshed with the gear 144. The gear 146 is a two-stage gear having a large-diameter gear and a small-diameter gear. The small-diameter gear of the gear 146 is meshed with the gear 145.

The second movable gear 147 is movable between a second transmission position depicted by solid lines, and a second non-transmission position depicted with phantom lines. In the second transmission position, the second movable gear 147 is meshed with the second output gear 148 and transmits the drive force to the second output gear 148. In the second non-transmission position, the second movable gear 147 is separated from the second output gear 148 and does not transmit the drive force thereto. The second movable gear 147 is constantly meshed with the large-diameter gear of the gear 146.

The second movable gear 147 is moved to the second transmission position when the main motor M1 rotates forward. The second movable gear 147 is moved to the second non-transmission position when the main motor M1 rotates in reverse.

The second output gear 148 is configured to output the drive force for the sheet-feeding mechanism 22. When receiving the drive force from the main motor M1, the sheet-feeding mechanism 22 feeds a sheet S toward the image-forming unit 30.

The second output gear 148 is an example of "second gear" in the fourth gear train of the disclosure. The second movable gear 147 is an example of "second movable gear" in the fourth gear train of the disclosure. The second output gear 148 is also an example of "first gear" in the first gear train of the disclosure, and the second movable gear 147 is also an example of "movable gear" in the first gear train of the disclosure.

The controller 2 (see FIG. 1) includes a CPU, a ROM, a RAM, and an input/output circuit. The controller 2 is configured to perform control by executing prestored programs. The controller 2 is configured to drive and halt the main motor M1 and control the direction in which the output shaft of the main motor M1 rotates. The controller 2 is also configured to control driving and halting of the process motor M2. The controller 2 is also configured to control the electromagnetic clutches EC1-EC3.

Through these operations, the controller 2 is configured to control when the developing rollers 61 contact and separate from the photosensitive drums 50. The controller 2 is also configured to control driving and halting of the photosensitive drums 50, the cleaning rollers 56, the developing rollers 61, and the heating roller 81A. The controller 2 is also configured to control the nip pressure between the heating unit 81 and pressure unit 82 of the fixing device 80.

The controller 2 is configured to perform printing in either a color printing mode or a monochrome printing mode.

In the color printing mode, the controller 2 forms images on the sheets S using all of the developing roller 61Y, developing roller 61M, developing roller 61C, and developing roller 61K.

When the image-forming apparatus 1 is in the standby state prior to executing printing, all the developing rollers 61 are in their separated positions. In the color printing mode, the controller 2 moves all the developing rollers 61 (61Y, 61M, 61C, and 61K) from their separated positions to the contact positions to form images on the sheets S.

In the monochrome printing mode, the controller 2 forms images on the sheets S using only the developing roller 61K. Specifically, in the monochrome printing mode, the controller 2 moves only the developing roller 61K from the separated position to the contact position to form images on the sheets S.

As illustrated in FIG. 2, the image-forming apparatus 1 further includes the sensors 4K and 4C. The sensor 4K detects the position of the cam follower 170K. The sensor 4C detects the positions of the cam followers 170Y, 170M, and 170C. More specifically, the sensor 4C directly detects the position of the cam follower 170C, and indirectly detects the positions of the cam followers 170Y and 170M.

Each of the sensors 4K and 4C has a light-emitting element 4P and a light-receiving element 4R. The light-emitting element 4P is configured to emit a detection light, and the light-receiving element 4R can receive the detection light from the light-emitting element 4P. The light-emitting element 4P and light-receiving element 4R in each of the sensors 4K and 4C are arranged inside the gear cover 500 such that the sensors 4K and 4C can detect the rib 174 of the corresponding cam followers 170 through through-holes 550 formed in the gear cover 500 (see FIG. 8).

The rib 174 of the cam follower 170K is positioned between the corresponding light-emitting element 4P and light-receiving element 4R when the cam follower 170K is in the pressing position and is withdrawn from an optical path between the light-emitting element 4P and light-receiving element 4R when the cam follower 170K is in the non-pressing position. Similarly, the rib 174 of the cam follower 170C is positioned between the corresponding light-emitting element 4P and light-receiving element 4R when the cam follower 170C is in the pressing position and is withdrawn from the optical path between the light-emitting element 4P and light-receiving element 4R when the cam follower 170C is in the non-pressing position.

With this configuration, the light-receiving elements 4R of the corresponding sensors 4K and 4C cannot receive the detection light emitted from the light-emitting elements 4P when the cam followers 170 are at the pressing position because the detection light is blocked by the corresponding ribs 174. On the other hand, the light-receiving elements 4R of the sensors 4K and 4C can receive the detection light from the light-emitting elements 4P when the cam followers 170 are at the non-pressing position. In this way, the sensors 4K and 4C can detect whether the corresponding cam followers 170 (170K, 170C) are in the pressing position or the non-pressing position based on whether the detection light is received.

When the cam follower 170 is at the pressing position, the corresponding developing roller 61 is in the separated position. When the cam follower 170 is at the non-pressing position, the corresponding developing roller 61 is in the contact position. Therefore, the sensors 4K and 4C can detect whether the corresponding developing rollers 61 are in the separated position or the contact position through the cam followers 170.

The sensor 4K can detect the rib 174 of the cam follower 170K, and the sensor 4C can detect the rib 174 of the cam follower 170C. Since the cam followers 170 are common parts in the present embodiment, each of the four cam followers 170 has the rib 174. However, the ribs 174 of the cam follower 170Y and 170M do not function as parts to be detected by sensors 4K and 4C.

The controller 2 is configured to execute a first process, a second process, and a connection process.

In the first process, the controller 2 sets the nip pressure to the first nip pressure (high pressure) by rotating the main motor M1 forward and placing the electromagnetic clutch EC3 in the transmission state.

In the second process, the controller 2 sets the nip pressure to the second nip pressure (low pressure) by rotating the main motor M1 in reverse and placing the electromagnetic clutch EC3 in the transmission state.

In the connection process, the controller 2 moves the movable gear 131 from the non-transmission position to the transmission position by rotating the main motor M1 forward while the electromagnetic clutch EC3 is in the interruption state. After completing the connection process, the controller 2 halts the main motor M1.

By performing the connection process after executing the second process, the controller 2 can wait for a print command while the movable gear 131 is meshed with the output gear 132. In other words, the controller 2 has the movable gear 131 meshed with the output gear 132 prior to receiving a print command. Even if the power to the image-forming apparatus 1 is turned off or the image-forming apparatus 1 enters a sleep state after the connection process and before the controller 2 receives a print command, the movable gear 131 remains in the transmission position meshed with the output gear 132.

Figure 18:
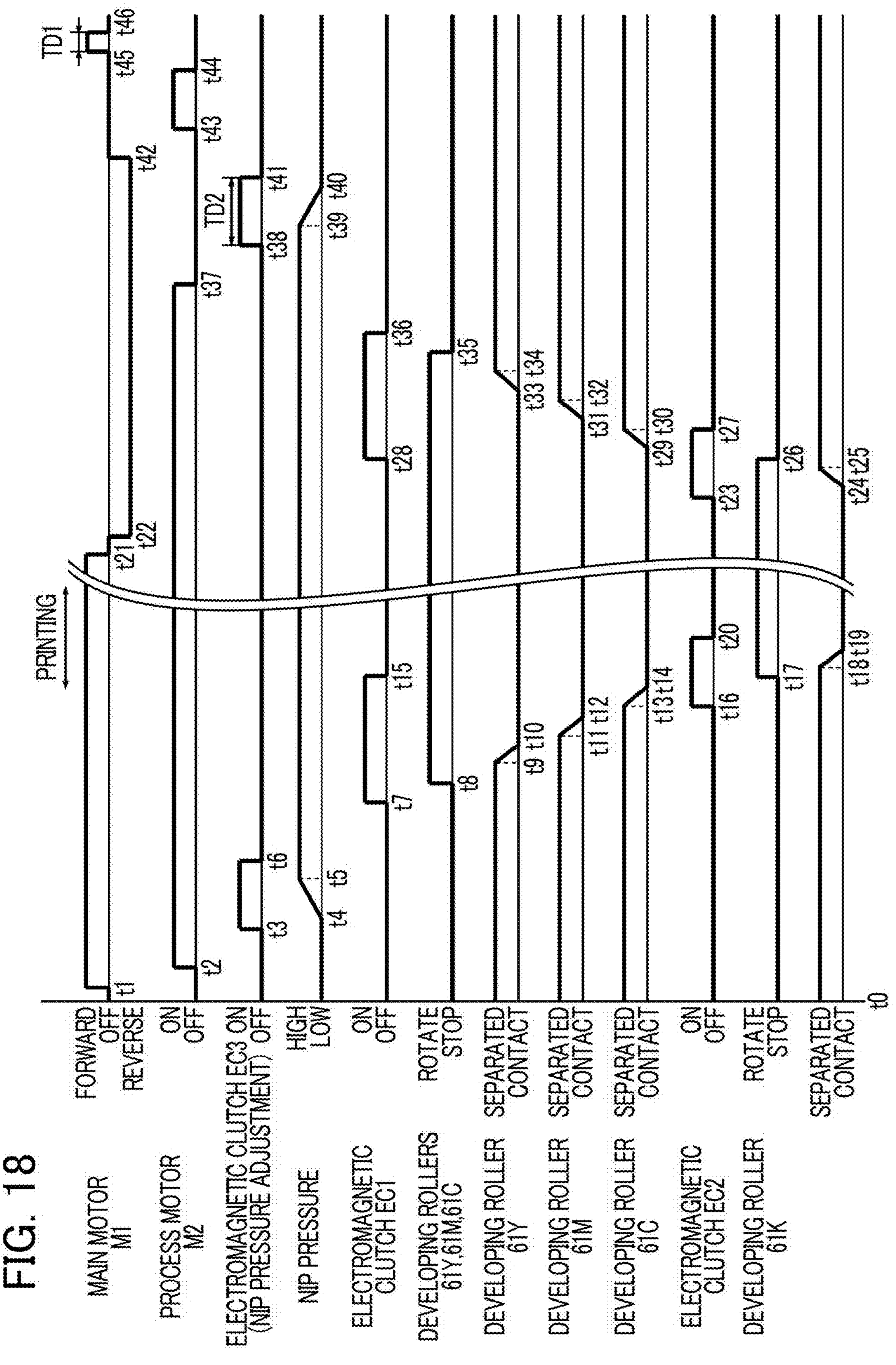
FIG. 18 is a timing chart illustrating one example of operations performed by a controller in the image-forming apparatus.

As illustrated in FIG. 18, in the connection process, the main motor M1 is configured to be driven for a time duration TD1 which is set shorter than a time duration TD2 for which the main motor M1 is configured to be driven in the second process.

The time duration TD1 of the main motor M1 in the connection process may be set to such a time period that is required to move the movable gear 131 from the non-transmission position to the transmission position, for example.

The controller 2 can also execute a cleaning process to clean the photosensitive drums 50 by driving the process motor M2. In the cleaning process, the controller 2 transfers toner remaining on the photosensitive drums 50 onto the conveying belt 73 and collects this toner in the waste toner box TB illustrated in FIG. 1. In this process, toner on the photosensitive drums 50 may be collected by the corresponding cleaning rollers 56 or toner on the cleaning rollers 56 may be transferred onto the conveying belt 73 via the corresponding photosensitive drums 50. In the present embodiment, the controller 2 executes the cleaning process (at time t43) following the second process (after time t41), and executes the connection process (at time t45) following the cleaning process.

The controller 2 can also execute a pressing process and a separating process.

In the pressing process, the controller 2 moves the developing rollers 61 to their contact positions by rotating the main motor M1 forward and connecting at least one of the electromagnetic clutches EC1 and EC2.

In the separating process, the controller 2 moves the developing rollers 61 into their separated positions by rotating the main motor M1 in reverse and connecting at least one of the electromagnetic clutches EC1 and EC2. The controller 2 executes the second process (at time t38) following the separating process (time t36).

When printing in the monochrome printing mode, the controller 2 performs the pressing process and the separating process for only the developing roller 61K by controlling only the electromagnetic clutch EC2. When printing in the color printing mode, the controller 2 performs the pressing process and the separating process for the developing roller 61 of each color by controlling both the electromagnetic clutches EC1 and EC2.

Next, sample operations of the controller 2 when executing printing will be described. In the following description, placing the electromagnetic clutches EC1-EC3 in their transmission states will be referred to as turning on the electromagnetic clutches EC1-EC3, while placing the electromagnetic clutches EC1-EC3 in their interruption states will be referred to as turning off the electromagnetic clutches EC1-EC3.

First, operations of the controller 2 when printing in the color printing mode will be described with reference to the timing chart of FIG. 18.

As illustrated in FIG. 18, all the developing rollers 61 in the image-forming apparatus 1 are in their separated positions during the standby state (at time t0). Further, the nip pressure between the heating unit 81 and pressure unit 82 is the low nip pressure during the standby state. Additionally, both the movable gear 131 and the second movable gear 147 are in the transmission position during the standby state since the connection process described later is configured to be executed just before printing is completed.

When printing in the color printing mode, the controller 2 drives the main motor M1 to rotate forward (at time t1). Since the movable gear 131 and the second movable gear 147 are already in their transmission positions at this time, the drive force of the main motor M1 is immediately transmitted to the heating roller 81A and the sheet-feeding mechanism 22 with no abnormal noises being generated by a collision between the movable gear 131 and output gear 132 or a collision between the second movable gear 147 and second output gear 148.

Thus, the heating roller 81A and the rollers in the sheet-feeding mechanism 22 begin to rotate. The drive force of the main motor M1 is also transmitted to the first discharge rollers 83 and the second discharge rollers 91, thereby rotating the first discharge rollers 83 and second discharge rollers 91.

Next, the controller 2 drives the process motor M2 (at time t2). As a result, the drive force of the process motor M2 is transmitted to the photosensitive drums 50 and cleaning rollers 56, causing the photosensitive drums 50 to rotate.

Next, the controller 2 turns on the electromagnetic clutch EC3 (at time t3). As a result, the drive force from the main motor M1 is transmitted to the nip-pressure adjusting cams 230 of the nip-pressure adjusting mechanism 200, rotating the nip-pressure adjusting cams 230 in the third rotating direction R3 from the second position to the first position. In this way, the nip pressure between the heating unit 81 and pressure unit 82 is switched from the low nip pressure to the high nip pressure (from time t4 to time t5).

Once the nip pressure between the heating unit 81 and pressure unit 82 has switched to the high nip pressure, the controller 2 turns off the electromagnetic clutch EC3 (at time t6).

Subsequently, the controller 2 turns on the electromagnetic clutch EC1 (at time t7). As a result, the drive force from the main motor M1 is transmitted to the separating cams 150Y, 150M, and 150C through the first separation gear train GT11, rotating the separating cams 150Y, 150M, and 150C in the first rotating direction R1.

Following the time t7, the drive force of the process motor M2 is transmitted to the developing rollers 61Y, 61M, and 61C, rotating the developing rollers 61Y, 61M, and 61C (at time t8). Here, a drive force switching mechanism (not illustrated) functions to transmit or interrupt the drive force from the process motor M2 to the developing rollers 61Y, 61M, and 61C.

The drive force switching mechanism (not illustrated) has, for example, a third output gear, a third movable gear that moves between a transmission position and a non-transmission position, and a switching cam that switches the position of the third movable gear. In the transmission position, the third movable gear is meshed with the third output gear. In the non-transmission position, the third movable gear is separated from the third output gear.

The switching is rotatable between a first phase and a second phase. In the first phase, the third movable gear is placed in the non-transmission position. In the second phase, the third movable gear is placed in the transmission position. The drive force of the main motor M1 is transmitted to the switching cam via the electromagnetic clutch EC1. The switching cam moves to the second phase when the main motor M1 rotates forward and moves to the first phase when the main motor M1 rotates in reverse. Alternatively, the drive force switching mechanism may be an electromagnetic clutch.

Following the time t8, the developing roller 61Y is moved from the separated position to the contact position by the separating cam 150Y rotating in the first rotating direction R1 (from time t9 to time t10). Next, the developing roller 61M is moved from the separated position to the contact position by the separating cam 150M rotating in the first rotating direction R1 (from time t11 to time t12). Next, the developing roller 61C is moved from the separated position to the contact position by the separating cam 150C rotating in the first rotating direction R1 (from time t13 to time t14).

Once a prescribed time period has elapsed since a time at which the sensor 4C detected the developing rollers 61Y, 61M, and 61C at the contact position, the controller 2 turns off the electromagnetic clutch EC1 (at time t15).

The controller 2 also turns on the electromagnetic clutch EC2 at time 16 which is a timing that the developing roller 61K is to be moved from the separated position to the contact position after the developing roller 61C was moved to the contact position (after time t14). As a result, the electromagnetic clutch EC2 transmits the drive force of the main motor M1 to the separating cam 150K, rotating the separating cam 150K in the first rotating direction R1.

Following the time t16, the drive force of the process motor M2 is transmitted to the developing roller 61K through the second-developing-roller drive gear train GT7, rotating the developing roller 61K (at time t17). Here, a second drive force switching mechanism CM illustrated in FIG. 10 functions to transmit or interrupt the drive force from the process motor M2 to the developing roller 61K.

The second drive force switching mechanism CM has a planetary gear mechanism 180, and a switching lever 160. The drive force of the process motor M2 is transmitted to the developing roller 61K via the planetary gear mechanism 180.

The switching lever 160 is pivotable between a transmission position and a non-transmission position in response to the rotation of the separating cam 150K. The separating cam 150K has a protrusion 154 (see FIGS. 4 and 6A-6B, 10) that can engage with the switching lever 160.

The planetary gear mechanism 180 includes an input element, an output element, and a transmission element 181.

The input element receives the drive force of the process motor M2. The output element outputs this drive force for the developing roller 61K.

The transmission element 181 can transmit the drive force from the input element to the output element when rotation thereof is restricted. The transmission element 181 does not transmit the drive force from the input element to the output element when rotation thereof is not restricted.

When in the transmission position, the switching lever 160 engages with and restricts the rotation of the transmission element 181. As a result, the drive force of the process motor M2 inputted into the planetary gear mechanism 180 is transmitted to the developing roller 61K.

When in the non-transmission position, the switching lever 160 is detached from the transmission element 181 and does not restrict rotation of the transmission element 181. As a result, the drive force of the process motor M2 inputted into the planetary gear mechanism 180 is not transmitted to the developing roller 61K. Alternatively, the second drive force switching mechanism CM may be configured as an electromagnetic clutch.

At a timing following the time t14 when the developing roller 61C moved from the separated position to the contact position, the developing roller 61K is moved from the separated position to the contact position by the separating cam 150K rotating in the first rotating direction R1 (from time t18 to time t19).

After a prescribed time period has elapsed since the sensor 4K detected the developing roller 61K at the contact position, the controller 2 turns off the electromagnetic clutch EC2 (at time t20).

Thus, by rotating the main motor M1 forward as described above, the controller 2 controls the separating mechanism 5 to move the developing roller 61Y, developing roller 61M, developing roller 61C, and developing roller 61K from their separated positions to their contact positions sequentially in the order of the developing roller 61Y, developing roller 61M, developing roller 61C, and developing roller 61K (from time t9 to time t19).

Specifically, while the main motor M1 is rotating forward, the separating mechanism 5 first moves the developing roller 61Y from the separated position to the contact position, and subsequently moves the developing roller 61M from the separated position to the contact position. After moving the developing roller 61M to the contact position, the separating mechanism 5 then moves the developing roller 61C from the separated position to the contact position. After moving the developing roller 61C to the contact position, the controller 2 also controls the separating mechanism 5 through the electromagnetic clutch EC2 while the main motor M1 is rotating forward to move the developing roller 61K from the separated position to the contact position.

After placing each of the developing rollers 61Y, 61M, 61C, and 61K at their contact positions, the controller 2 executes printing. When the sheets S are discharged into the discharge tray 13 and the printing is complete, the controller 2 temporarily halts the main motor M1 (at time t21). Subsequently, the controller 2 starts driving the main motor M1 to rotate in reverse (at time t22).

As a result, the movable gear 131 moves from the transmission position to the non-transmission position so that the drive force of the main motor M1 is no longer transmitted to the heating roller 81A, halting the heating roller 81A and the pressure unit 82 (the pressure roller). Further, the second movable gear 147 moves from the transmission position to the non-transmission position so that the drive force of the main motor M1 is no longer transmitted to the sheet-feeding mechanism 22, thereby halting the sheet-feeding mechanism 22. Still further, the drive force of the main motor M1 is no longer transmitted to the first discharge rollers 83 and second discharge rollers 91, halting the first discharge rollers 83 and the second discharge rollers 91.

After driving the main motor M1 to rotate in reverse, the controller 2 turns on the electromagnetic clutch EC2 (at time t23). As a result, the drive force is transmitted from the main motor M1 to the separating cam 150K, rotating the separating cam 150K in the second rotating direction R2.

Thereafter, the developing roller 61K is moved from the contact position to the separated position by the separating cam 150K rotating in the second rotating direction R2 (from time t24 to time t25). Following the time t25, the developing roller 61K is halted (at time t26).

Once a prescribed time period has elapsed from a timing at which the sensor 4K detected the developing roller 61K at the separated position, the controller 2 turns off the electromagnetic clutch EC2 (at time t27).

The controller 2 also turns on the electromagnetic clutch EC1 at time t28 for moving the developing roller 61C from the contact position to the separated position after the developing roller 61K was moved to the separated position. As a result, the drive force of the main motor M1 is transmitted to the separating cams 150Y, 150M, and 150C, rotating the separating cams 150Y, 150M, and 150C in the second rotating direction R2.

Thereafter, the separating cam 150C rotating in the second rotating direction R2 moves the developing roller 61C from the contact position to the separated position at such a timing (from time t29 to time t30) following the time t25 when the developing roller 61K was moved from the contact position to the separated position. Next, the separating cam 150M rotating in the second rotating direction R2 moves the developing roller 61M from the contact position to the separated position (from time t31 to time t32). Lastly, the separating cam 150Y rotating in the second rotating direction R2 moves the developing roller 61Y from the contact position to the separated position (from time t33 to time t34). The developing rollers 61Y, 61M, and 61C are halted at time t35 following the time t34.

Once a prescribed time period has elapsed from a timing at which the sensor 4C detected the developing rollers 61Y, 61M, and 61C at their separated positions, the controller 2 turns off the electromagnetic clutch EC1 (at time t36).

As described above, the controller 2 rotates the main motor M1 in reverse and controls the separating mechanism 5 to move the developing rollers 61Y, 61M, 61C, and 61K from their contact positions to their separated positions sequentially in the order of the developing roller 61K, developing roller 61C, developing roller 61M, and developing roller 61Y (from time t24 to time t34).

Specifically, while the main motor M1 is rotating in reverse, the controller 2 controls the separating mechanism 5 with the electromagnetic clutches EC1 and EC2 to move the developing roller 61K from the contact position to the separated position and subsequently to move the developing roller 61C from the contact position to the separated position. After the developing roller 61C has been moved into the separated position, the separating mechanism 5 moves the developing roller 61M from the contact position to the separated position. Once the developing roller 61M has been moved to the separated position, the separating mechanism 5 moves the developing roller 61Y from the contact position to the separated position.

Once all the developing rollers 61Y, 61M, 61C, and 61K are placed at their separated positions, the controller 2 halts the process motor M2 (at time t37). As a result, the drive force from the process motor M2 is no longer transmitted to the photosensitive drums 50, thereby halting the photosensitive drums 50.

Subsequently, the controller 2 turns on the electromagnetic clutch EC3 (at time t38). The electromagnetic clutch EC3 transmits the drive force of the main motor M1 to the nip-pressure adjusting cams 230 of the nip-pressure adjusting mechanism 200, rotating the nip-pressure adjusting cams 230 in the fourth rotating direction R4 from the first position (FIG. 16B) to the second position (FIG. 16A). As a result, the nip pressure between the heating unit 81 and pressure unit 82 is switched from the high nip pressure to the low nip pressure (from time t39 to time t40).

Once the nip pressure between the heating unit 81 and pressure unit 82 has switched to the low nip pressure, the controller 2 turns off the electromagnetic clutch EC3 (at time t41). Subsequently, the controller 2 halts the main motor M1 (at time t42).

Thereafter, the controller 2 begins driving the process motor M2 to execute the cleaning process (from time t43 to time t44). After completing the cleaning process, the controller 2 rotates the main motor M1 forward to execute the connection process (from time t45 to time t46).

To execute printing in the monochrome printing mode, the controller 2 controls the main motor M1, the process motor M2, the electromagnetic clutch EC2, and the electromagnetic clutch EC3 in the same manner described for printing in the color printing mode while leaving the electromagnetic clutch EC1 off.

The embodiment described above can achieve the following technical advantages.

By performing the connection process after completing the second process, the controller 2 is configured to wait for a print command while the movable gear 131 is meshed with the output gear 132. This configuration can suppress the generation of an abnormal noise caused by contact between the movable gear 131 and the output gear 132 when the controller 2 begins printing after receiving a print command. Further, the controller 2 can start driving the heating roller 81A immediately after receiving a print command since there is no need to perform the connection process when starting printing after receiving a print command.

By setting the time duration TD1 for driving the main motor M1 in the connection process to be shorter than the time duration TD2 for driving the main motor M1 in the second process, the controller 2 can perform the connection process more quickly than if the time duration TD1 for driving the main motor M1 in the connection process were longer than the time duration TD2 for driving the main motor M1 in the second process. This configuration can also suppress unnecessary rotation of the output gear 132 in mesh with the movable gear 131.

By configuring the second movable gear 147 to move toward the second transmission position by forward rotation of the main motor M1, the second movable gear 147 becomes meshed with the second output gear 148 when the controller 2 performs the connection process. Accordingly, this configuration can suppress the generation of an abnormal noise caused by contact between the second movable gear 147 and the second output gear 148 when the controller 2 starts printing after receiving a print command.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The controller 2 may rotate the main motor M1 forward at a first speed when executing a printing process to form images on the sheets S and may rotate the main motor M1 forward at a second speed slower than the first speed when executing the connection process. By the controller 2 rotating the main motor M1 forward at the second speed, which is slower than the first speed, this configuration can reduce the noise generated by contact between the movable gear 131 and output gear 132 when the connection process is executed.

The rotatable body of the disclosure configured to convey sheets is not limited to the heat roller, but may be a pressure roller, for example. The rotatable body of the disclosure may also be a feeding roller for feeding sheets to the image-forming unit (transfer roller).

The movable member of the disclosure is not limited to the first cam (the nip-pressure adjusting cams 230), but may be the second cam (the separating cams 150) configured to move the developing roller between the contact position and the separated position.

The first cam of the disclosure may be configured to move linearly. The second cam of the disclosure may also be configured to move linearly.

The cleaning member of the disclosure may also be blades or the like that do not rotate.

The controller 2 may perform the connection process after initiating a warmup process and before entering the standby state. Here, the warmup process is performed to raise the temperature of the heating roller 81A to a preparation temperature, which is lower than a fixing temperature suitable for fixing toner images.

The controller 2 may perform the warmup process when the power to the image-forming device 1 is turned on, for example. In the warmup process, the controller 2 may execute the first process, followed by the second process. The controller 2 may perform the connection process after completing the second process and just prior to ending the warmup process, for example.

In the embodiment described above, the fixing-device drive gear train GT2 is configured to transmit the drive force of the main motor M1 to the heating roller 81A (the heating unit 81). However, the fixing device drive gear train GT2 may be configured to transmit the drive force of the main motor M1 to the pressure unit 82 (pressure roller), for example. Alternatively, the fixing device drive gear train GT2 may be configured to transmit the drive force of the main motor M1 to both the heating unit 81 and the pressure unit 82 (pressure roller).

The heating unit 81 includes the heating roller 81A (as the heat roller of the disclosure) in the embodiment described above, but the heat roller of the disclosure may be configured as including an endless belt, for example. Further, while the pressure unit 82 is a pressure roller in the above embodiment, the pressure roller of the disclosure may be configured of an endless belt, and a pad that presses the endless belt against the heat roller, for example.

In the embodiment described above, the nip-pressure adjusting cams 230 (as the first cam of the disclosure) are configured to switch the nip pressure between the heating unit 81 and pressure unit 82 between two levels: a low nip pressure (as the second nip pressure) and a high nip pressure (as the first nip pressure). However, the first cam of the disclosure may be configured to change the nip pressure among three or more levels, for example. In other words, the first nip pressure may include a plurality of nip pressures. Further, the nip pressure may be set to 0 for the low nip pressure (as the second nip pressure). For the second nip pressure, the heat roller and pressure roller may be separated from each other, for example.

In the embodiment described above, the nip-pressure adjusting cams 230 (as the first cam of the disclosure) are configured to switch the nip pressure by moving the pressure unit 82. However, the first cam of the disclosure may be configured to switch the nip pressure by moving the heat roller rather than the pressure roller, for example. Alternatively, the first cam of the disclosure may be configured to switch the nip pressure by moving both the heat roller and pressure roller.

In the embodiment described above, the separating cams 150Y, 150M, and 150C are integrally controlled, but the separating cams 150Y, 150M, and 150C may be controlled individually, for example.

In the embodiment described above, the stoppers 530 have a wall-like structure, but the stoppers 530 may be configured to have a rod shape, for example. Further, while the stoppers 530 are formed integrally with the cover wall 510 in the above embodiment, the stoppers 530 may be provided in a form of members that are fixed to the cover wall, for example.

Alternatively, the stoppers 530 may be omitted from the image-forming apparatus 1. In this case, cam bosses and slide shafts in the corresponding cam followers 170 (corresponding to the bosses 152 and slide shafts 171 of the embodiment) may be formed with triangular, square, D-shaped, or elliptical cross sections in the portions that engage with each other to restrict rotation of the cam followers 170.

While the rotational resistance member 300 is a leaf spring in the embodiment described above, the rotational resistance member 300 may be a type of spring other than a leaf spring, such as a coil spring. Alternatively, the rotational resistance member 300 may be in a form of an elastic body other than a spring, such as a sponge. The direction in which the rotational resistance member 300 presses the idle gear 118 along the rotational axis of the same may be the opposite direction to that in the embodiment. The rotational resistance member 300 may also be configured to press the idle gear 118 in a direction orthogonal to the rotational axis of the idle gear 118.

While the photosensitive drums 50 are rotatably supported by the drawer 55 in the above embodiment, the photosensitive drum of the disclosure may be detachably mountable on a drawer, for example. Specifically, the image-forming apparatus of the disclosure may include drum cartridges each possessing a photosensitive drum, and the drum cartridges may be removably mounted on a drawer. The image-forming apparatus of the disclosure may also utilize a cartridge that possesses both a photosensitive drum and a developing roller such that a so-called drum cartridge and the developing cartridge 60 of the above embodiment are incorporated as a single unit, and these cartridges may also be detachably mounted on a drawer.

The image-forming apparatus 1 of the above embodiment is a color printer capable of forming color images, but the image-forming device of the disclosure may be embodied as a monochrome printer that can only form monochrome images, for example. Alternatively, the image-forming device of the disclosure may be embodied as a copier or a multifunction peripheral, for example.

The elements described in the above embodiment and variations can be implemented in any combination.

What is claimed is:

1. An image-forming apparatus comprising:

a motor configured to rotate forward and in reverse;

a transfer roller;

a fixing device including a heat roller and a pressure roller configured to nip a sheet therebetween to fix an image to the sheet, the heat roller and the pressure roller providing a nip pressure therebetween;

a first cam movable between a first position and a second position, the first cam at the first position bringing the nip pressure into a first nip pressure, the first cam at the second position bringing the nip pressure into a second nip pressure lower than the first nip pressure, the first cam being movable to the first position in response to forward rotation of the motor, the first cam being movable to the second position in response to reverse rotation of the motor;

a first gear train configured to transmit a drive force of the motor to one of the heat roller and the pressure roller, the first gear train including:

a first gear; and a movable gear movable between a transmission position and a non-transmission position, the movable gear at the transmission position being in mesh with the first gear and being configured to transmit the drive force to the first gear, the movable gear at the non-transmission position being separated from the first gear and being configured not to transmit the drive force to the first gear, the movable gear being movable to the transmission position in response to forward rotation of the motor, the movable gear being movable to the non-transmission position in response to reverse rotation of the motor;

a second gear train configured to transmit the drive force of the motor to the first cam, the second gear train including:

a switching mechanism configured to switch in state between a transmission state and an interruption state, the switching mechanism at the transmission state being configured to transmit the drive force to the first cam, the switching mechanism at the interruption state being configured not to transmit the drive force to the first cam; and a controller configured to perform:

a first process for setting the nip pressure to the first nip pressure by rotating the motor forward and placing the switching mechanism in the transmission state;

a second process for setting the nip pressure to the second nip pressure by rotating the motor in reverse and placing the switching mechanism in the transmission state; and a connection process for moving the movable gear from the non-transmission position to the transmission position by rotating the motor forward while the switching mechanism is in the interruption state, wherein the controller is configured to wait for a print command in a state where the movable gear is meshed with the first gear by performing the connection process after completing the second process.

2. The image-forming apparatus according to claim 1, wherein the controller is configured to rotate the motor forward at a first speed when executing a printing process to form an image on a sheet, and wherein the controller is configured to rotate the motor forward at a second speed slower than the first speed when executing the connection process.

3. The image-forming apparatus according to claim 1, wherein the controller is configured to drive the motor for a first time duration when performing the connection process, and wherein the controller is configured to drive the motor for a second time duration when performing the second process, the first time duration being shorter than the second time duration.

4. The image-forming apparatus according to claim 1, wherein the controller is configured to halt the motor after completing the connection process.

5. The image-forming apparatus according to claim 1, wherein the switching mechanism is an electromagnetic clutch.

6. The image-forming apparatus according to claim 1, further comprising a sensor configured to detect whether the first cam is at the first position or at the second position.

7. The image-forming apparatus according to claim 1, wherein the first gear train is configured to transmit the drive force of the motor to the heat roller, and wherein the pressure roller is rotatable following rotation of the heat roller.

8. The image-forming apparatus according to claim 1, further comprising:

a photosensitive drum;

a cleaning member configured to clean a peripheral surface of the photosensitive drum; and a process motor configured to drive the photosensitive drum, wherein the controller is further configured to perform a cleaning process for cleaning the peripheral surface of the photosensitive drum by driving the process motor, and wherein the controller is configured to:

perform the cleaning process after completing the second process; and perform the connection process after completing the cleaning process.

9. The image-forming apparatus according to claim 8, further comprising:

a developing roller movable between a contact position and a separated position relative to the photosensitive drum, the developing roller at the contact position being in contact with the photosensitive drum, the developing roller at the separated position being separated from the photosensitive drum;

a second cam configured to move the developing roller between the contact position and the separated position; and a third gear train configured to transmit the drive force of the motor to the second cam, the third gear train including an electromagnetic clutch, wherein the controller is further configured to perform:

a pressing process for moving the developing roller to the contact position by rotating the motor forward and connecting the electromagnetic clutch; and a separating process for moving the developing roller to the separated position by rotating the motor in reverse and connecting the electromagnetic clutch.

10. The image-forming apparatus according to claim 9, wherein the controller is configured to perform the second process after completing the separating process.

11. The image-forming apparatus according to claim 1, further comprising:

a feeding roller configured to feed the sheet to the transfer roller; and a fourth gear train configured to transmit the drive force of the motor to the feeding roller, the fourth gear train including:

a second gear; and a second movable gear movable between a second transmission position and a second non-transmission position, the second movable gear at the second transmission position being in mesh with the second gear and being configured to transmit the drive force to the second gear, the second movable gear at the second non-transmission position being separated from the second gear and being configured not to transmit the drive force to the second gear, the second movable gear being movable to the second transmission position in response to forward rotation of the motor, the second movable gear being movable to the second non-transmission position in response to reverse rotation of the motor.

12. An image-forming apparatus comprising:

a motor configured to rotate forward and in reverse;

a transfer roller;

a rotatable body configured to convey a sheet;

a movable member movable between a first position and a second position, the movable member being movable to the first position in response to forward rotation of the motor, the movable member being movable to the second position in response to reverse rotation of the motor;

a first gear train configured to transmit a drive force of the motor to the rotatable body, the first gear train including:

a first gear; and a movable gear movable between a transmission position and a non-transmission position, the movable gear at the transmission position being in mesh with the first gear and being configured to transmit the drive force to the first gear, the movable gear at the non-transmission position being separated from the first gear and being configured not to transmit the drive force to the first gear, the movable gear being movable to the transmission position in response to forward rotation of the motor, the movable gear being movable to the non-transmission position in response to reverse rotation of the motor;

a second gear train configured to transmit the drive force of the motor to the movable member, the second gear train including:

a switching mechanism configured to switch in state between a transmission state and an interruption state, the switching mechanism at the transmission state being configured to transmit the drive force to the movable member, the switching mechanism at the interruption state being configured not to transmit the drive force to the movable member; and a controller configured to perform:

a first process for moving the movable member to the first position by rotating the motor forward and placing the switching mechanism in the transmission state;

a second process for moving the movable member to the second position by rotating the motor in reverse and placing the switching mechanism in the transmission state; and a connection process for moving the movable gear from the non-transmission position to the transmission position by rotating the motor forward while the switching mechanism is in the interruption state, wherein the controller is configured to wait for a print command in a state where the movable gear is meshed with the first gear by performing the connection process after completing the second process.

13. The image-forming apparatus according to claim 12, further comprising a fixing device including a heat roller and a pressure roller configured to nip the sheet therebetween to fix an image to the sheet, one of the heat roller and the pressure roller serving as the rotatable body.

14. The image-forming apparatus according to claim 13, wherein the heat roller and the pressure roller provide a nip pressure therebetween, and wherein the movable member is a first cam, the first cam at the first position bringing the nip pressure into a first nip pressure, the first cam at the second position bringing the nip pressure into a second nip pressure lower than the first nip pressure.

15. The image-forming apparatus according to claim 14, further comprising a sensor configured to detect whether the first cam is at the first position or at the second position.

16. The image-forming apparatus according to claim 13, wherein the first gear train is configured to transmit the drive force of the motor to the heat roller, and wherein the pressure roller is rotatable following rotation of the heat roller.

17. The image-forming apparatus according to claim 12, wherein the rotatable body is a feeding roller configured to feed the sheet to the transfer roller.

18. The image-forming apparatus according to claim 12, further comprising:

a photosensitive drum; and a developing roller movable between a contact position and a separated position, the developing roller at the contact position being in contact with the photosensitive drum, the developing roller at the separated position being separated from the photosensitive drum, wherein the movable member is a second cam configured to move the developing roller between the contact position and the separated position in response to rotation of the motor.

19. The image-forming apparatus according to claim 12, wherein the switching mechanism is an electromagnetic clutch.

* * * * *